United States Patent [19]

Arnold et al.

[11] Patent Number: 6,016,504
[45] Date of Patent: Jan. 18, 2000

[54] METHOD AND SYSTEM FOR TRACKING THE PURCHASE OF A PRODUCT AND SERVICES OVER THE INTERNET

[75] Inventors: John K. Arnold, Kent; John R. Bennett, Seattle; Peter O. Claar, Seattle; Kurt D. Dahl, Seattle; Jennifer L. Dobson, Seattle; Charles A. Fontaine, Seattle; Philip H. Johanson, Seattle; Donald G. McGuire, Mount Vernon; Mary Swanson, Edmonds; David G. Wagner, Issaquah; Steve Wainright, Seattle, all of Wash.

[73] Assignee: InfoSpace.com, Inc., Redmond, Wash.

[21] Appl. No.: 08/704,143

[22] Filed: Aug. 28, 1996

[51] Int. Cl.[7] .............................. G06F 17/60; G06F 17/30
[52] U.S. Cl. .......................... 709/200; 709/202; 709/203; 709/204; 709/217; 709/219; 709/227; 709/228; 709/229; 705/26; 705/27
[58] Field of Search ........................... 395/200.3–200.36, 395/200.47–200.5, 200.57–200.6; 707/10; 705/26–27, 39–40; 345/335; 709/200–206, 217–219, 227–229, 245–246

[56] References Cited

U.S. PATENT DOCUMENTS

| | | | |
|---|---|---|---|
| 5,590,197 | 12/1996 | Chen et al. | 380/24 |
| 5,603,029 | 2/1997 | Aman et al. | 709/105 |
| 5,623,656 | 4/1997 | Lyons | 709/206 |
| 5,664,110 | 9/1997 | Green et al. | 705/26 |
| 5,671,279 | 9/1997 | Elgamal | 380/23 |
| 5,692,132 | 11/1997 | Hogan | 705/27 |
| 5,708,780 | 1/1998 | Levergood et al. | 709/229 |
| 5,710,887 | 1/1998 | Chelliah et al. | 709/217 |
| 5,715,314 | 2/1998 | Payne et al. | 380/24 |
| 5,717,860 | 2/1998 | Graber et al. | 709/227 |
| 5,724,424 | 3/1998 | Gifford | 380/24 |
| 5,729,594 | 3/1998 | Klingman | 705/26 |
| 5,757,917 | 5/1998 | Rose et al. | 705/26 |
| 5,758,328 | 5/1998 | Giovannoli | 705/26 |
| 5,826,242 | 10/1998 | Montulli | 709/228 |
| 5,923,846 | 7/1999 | Gage et al. | 709/217 |

*Primary Examiner*—Zarni Maung
*Assistant Examiner*—Bharat Barot
*Attorney, Agent, or Firm*—Christensen O'Connor Johnson & Kindness PLLC

[57] ABSTRACT

A method for establishing and maintaining a virtual outlet ("VO") relationship on the Internet between an entity that controls and manages a Web site constituting a VO and a merchant that controls and manages a different Web site. The VO presents a series of VO Web pages to customers that contain descriptive information about products from one or more merchants. Customers can link through the VO Web pages directly to a merchant Web page provided to the customer computer by the merchant computer for the purpose of obtaining more detailed information about the product and for ordering the product. When the customer has finished ordering a product, the customer computer returns to a VO Web page. To the customer, it appears that the entire ordering process is conducted entirely within the VO Web pages. The merchant then credits the VO for the sale of the product to the customer, charges the purchase to the customer, and sends the ordered product to the customer.

28 Claims, 28 Drawing Sheets

Virtual Outlet Signup Form

The purpose of this page is for you, the Webmaster, to submit a request to become a Virtual Outlet.

*To start, let's establish who you are.*

Your organization name:

This is the full name of your organization as you would like other Web users to see it (this is the "user friendly" representation of your organization name.) *Example: "IBM" (not "International Busines Machines, Inc.")*

Organization: [UMall]

Your organization's address:

This is the address where we will be sending your commision checks.

| | |
|---|---|
| Official Org Name: | BCX Enterprises, Inc. |
| Org's Tax ID: | 111-11-1111 |
| Address: | 1234 Oak St. |
| Address2: | Suite 202 |
| City: | Seattle     State/Province: WA |
| Zip code: | 98121 |

Your "handle":

This "handle" will be used to identify you to us, and will be used within the URL's query strings that you use to connect to us. Don not use spaces or strange characters. Alphanumerics only! *Example: "MAYBERRY"*

Handle: [UMall]

Your handle password:

Type in a password. This password will allow you (and only you) to access your account.

| | |
|---|---|
| Password: | **** |
| Retype Password: | **** |

*Fig. 5*

Virtual Outlet Signup Example - Microsoft Internet Explorer

File  Edit  View  Go  Favorites  Help

Back  Forward  Stop  Refresh  Home  Search  Favorites  Print  Font  Links  Today's Links  Services Address: http://www.virtualoutlet.com/signup.htm

Your logo:

Type in the full URL of your logo, for example, "http://www.outpost.net/img/opn/OPLOGsm.GIF." You may leave this field blank, but your logo will not show on our pages.

Logo: http://www.umall.com/graphics/logos/mainlogo.bmp

Screen customization:

You may make our scrrns look just like an extension of your own Web Site by customizing colors and background images!

All information here is optional. Leave the fields blank and we'll use our defaults!

Background graphic:

Type in the full path to a copy of your background. Example: "http://www.outpost.net/img/opn/chalk.gif"

Backgrnd:

Text Colors:

Colors are defined in HTML as six digit hexadecimal numbers. Refer to an HTML manual for more details.

Backgrnd: COCOCO    Text: COCOCO    Link: 000EE    Visited: 400080    Click: FF0000

Check everything over, and submit the form. If all is well, then we will display you an example page.

*Fig. 6*

INFORMATION STORED AT SIGN-UP

| | |
|---|---|
| VIRTUAL OUTLET NAME | VIRTUAL OUTLET URL |
| VIRTUAL OUTLET MAILING ADDRESS | TAXPAYER ID |
| VIRTUAL OUTLET EMAIL ADDRESS | SOCIAL SECURITY NUMBER |
| PROPOSED PASSWARD | BANK ACCOUNT NUMBER |

URL OF LOGOS TO DISPLAY ON ORDER PAGE(S)
URL FOR GRAPHICS FOR BACKGROUND
COLORS FOR VARIOUS PARTS OF SCREEN
FONTS FOR TEXT
OTHER CHARACTERISTICS FOR HTML DISPLAY
NAVIGATION BAR
BANNER ADVERTISING

*Fig. 16*

METHOD AND SYSTEM FOR TRACKING THE PURCHASE OF A PRODUCT AND SERVICES OVER THE INTERNET

TECHNICAL FIELD

The present invention relates to a computer method and system for tracking product sales, and more particularly to a method and system for tracking sales on the Internet.

BACKGROUND OF THE INVENTION

The Internet and the World Wide Web

The Internet comprises a vast number of computers, network links between the computers, and protocol and other interface standards that provide a communication network for computer representatives to exchange computer data with other computer representatives. The World Wide Web ("WWW") was designed as an easy visual interface for representatives of the Internet. The WWW allows a server computer, called a Web site, to send graphical Web pages of information, called Web pages, to a remote representative's computer and allows the remote representative's computer to display the Web pages on a display. These Web pages may contain control regions, such as simulated push buttons, that allow the representative to acquire and display additional, related Web pages of information in a hypertext fashion.

The Internet is based on information exchange from servers to clients. Each client and server has an Internet address called a Uniform Resource Locator ("URL"). An example of a URL address is "http://acme.com/page1." The URL has two parts: (1) a scheme and (2) a scheme-specific part. The scheme identifies the high-level protocol through which the information is to be exchanged, and the scheme-specific part contains additional information useful in establishing a connection between a client and a server. The WWW uses the HTTP protocol. The "http" at the beginning of the example URL, above, is the scheme, and indicates that the Internet address specified by the example URL exchanges information using HTTP, and is therefore a WWW site. The remainder of the URL following the colon is the scheme-specific part that, for WWW servers, generally indicates a host HTTP server name and the file system path to a Web page to be transferred. In this example, the host HTTP server is identified by "acme.com" and the Web page is identified by "page1."

Currently, a Web page is defined by a HyperText Markup Language ("HTML") file. The software on a client that manages the Internet connections and interprets and effects the commands contained in HTML documents is called a browser. When a representative indicates to the browser a desire to view a Web page, the browser initiates a client computer request that the server transfer to the client computer an HTML file that defines the Web page. When the requested HTML file is received by the client computer, the browser uses the HTML file to construct the Web page and display it to the representative on the client computer display. The HTML file contains various commands for displaying text, graphics, controls, background colors for the Web page, and other displayed features. The HTML file may contain URL addresses of other Web pages available on the server, which allow the browser to offer to the representative hypertext-type selection and display of the other Web pages. In addition, the HTML file also may contain URL addresses, called hot links, to other Web pages at other Web sites. Thus, a representative may be able not only to navigate among Web pages available on the server to which he initially connected, but also among Web pages on entirely different servers. Additional types of Web page description facilities, other than HTML, are either currently available or planned for future release.

In general, the Web servers are stateless with respect to client transactions. In other words, at the HTTP protocol level, each transaction (e.g., request for an HTML file) is separate from all others. In other common networking system protocols, a client might initialize a connection to the server, conduct a series of requests from the server and receive information for each request, and then terminate the connection from the server, and the entire exchange, from the initialization to the termination of the connection, would be considered a transaction. In such systems, the client/server connection may be considered to be in one of several different states at any instance, depending on the nature of the requests and responses and their order. Such systems require that state information be saved by the server, and also usually by the client, and require time outs and other connection failure strategies. The stateless nature of the Web simplifies the server and client architectures.

Marketing Products on the Internet

The use and capabilities of the WWW have greatly increased in recent years. It is now a media that supports commerce and holds even greater promise for commerce in the future as a media that can connect buyers with sellers, can take actual orders, and can complete the associated payments.

However, the WWW today has several problems in supporting large scale commerce. One of the key problems is simply putting the buyers and sellers in contact. Because of the vastness of the WWW, even if a person knows what they want, they may not be able to find it. And, even more importantly, the WWW lacks in the ability to create "impulse" type buying in which a customer stumbles upon a product or service that appeals to them at that moment, and then allows them to make an immediate purchase.

For the sake of this discussion, the WWW can be divided into two kinds of Web sites: (1) those that attract Web surfers (i.e., potential customers) by providing rich content of specific interest to the Web surfer, and (2) those that actually are trying to sell a product or service. The content-rich sites vastly outnumber the selling sites. A problem for the selling sites is to get the potential customers who are at the content-rich sites to know that the selling site has a product that is available to be sold on the Web. However, a content-rich site typically needs some incentive (i.e., compensation) to put its Web surfers in contact with the selling sites.

Currently, a content-rich site can be compensated using a couple of different compensation methods. The existing methods, however, have several problems associated with them and ultimately do not provide an adequate incentive.

The first existing method is the WWW's version of the traditional advertising model. With this method, a seller simply creates a small graphic image, called a banner ad, and has the content-rich site place the ad in a prominent position on a Web page of the content-rich site. The banner ad has a hot link to the selling site. A Web surfer (i.e., potential customer) will notice the ad, then "click" on it and thereby pass through to the selling site, where a purchase may be made. With this method, the content-rich Web site is compensated in the traditional advertising way. Typically, the content-rich site displaying the ad will receive a fixed fee based on the number of times the ad was presented to potential customers.

There are several problems with banner advertising. A first problem is that when the Web surfer clicks on the banner ad, the surfer leaves the content-rich site and goes to the selling site and possibly will not return. This is a strong disincentive for the content-rich site owner because the owner wants the Web surfer to explore and to stay at its site for as long as possible.

A second problem is that, when a purchase is made, the selling site collects and retains information about the Web surfer (e.g., home address and telephone number). The seller can then market to the Web surfer directly. The content-rich site, however, does not take advantage of this information and typically is not compensated if additional purchases are made by the Web surfer.

A third problem is the standard problem of all traditional advertising—fairness. There is no connection between the compensation and the actual results of the ad. It may be that the selling site ended up making no sales at all to the people that were presented the ad, in which case the selling site paid money for no results. Conversely, perhaps many sales were made, in which case the content-rich site owner received too little compensation.

The second existing method is a commission based compensation model. This method is designed to address the fairness of advertising issue raised above. In this method, the content-rich site still attracts Web surfers and then points them to a selling site, either by using the same kind of banner ad, by using a simple hypertext link, or by using an even more complex "co-branded" Web page that acts as a bridge between the content-rich site and the selling site. In any case, the content-rich site is compensated only when the customer that it delivered to the selling site actually makes a purchase directly after linking from the content-rich site (as opposed to, for example, returning to the selling site a week later to make a purchase, in which case the content-rich site receives no commission).

This commission based method also has several problems. The first two problems are the same problems as with the advertising method: failure of customers to return to the content-rich Web site and lack of access to customer information by the content-rich Web site.

The third problem is again one of fairness. While it would appear that a commission on the sale is fair, a content-rich site owner is only compensated if the purchase is immediate. Once the potential purchaser has left the content-rich site and goes to the selling site, then from that moment on, they know about the selling site and how to get to it. The next time the purchaser wants to visit the selling site to make a purchase, the purchaser will simply go directly to the sellers site and bypass the content-rich site completely. When the Web surfer does this, the content-rich site will receive no commission on the later sales. So, in fact, the content-rich site owner receives a commission for delivering, at most, one sale; that is, the owner only receives a one-time commission if the customer purchases a product when the customer visits the selling site through the content-rich site. The content-rich site may have delivered a customer, potentially a life-long customer, to the selling site, for which the content-rich site owner will receive no ongoing commission.

A need has been recognized, therefore, for a way to track purchases on the Web that avoids the problems associated with the banner advertising method and the commission method. The invention described below addresses this need by providing an efficient, easily maintained, and flexible method for establishing a computer-based relationship between a content-rich site and a selling site.

SUMMARY OF THE INVENTION

The present invention is directed to a method for tracking a purchase by a customer of a product supplied by a merchant through what is referred to as a "virtual outlet," where the merchant, virtual outlet owner, and customer each have a computer connected through a network and where the purchase is conducted as a transaction over the network. To purchase the product, the customer requests a Web page from the virtual outlet computer. The requested Web page typically has a visual indication of the product and a link associated with the product. The link identifies a merchant Web page available from the merchant computer, identifies the virtual outlet, and identifies a return Web page of the virtual outlet. When the customer computer receives the requested Web page from the virtual outlet, it displays the Web page. When the customer selects the product to purchase from the displayed Web page, the customer computer sends to the merchant computer a request for the merchant Web page identified by the link associated with the product. The merchant computer modifies the merchant Web page to contain a return link so that upon completion of the purchase, the customer computer displays the return Web page of the virtual outlet identified by the link and sends to the customer computer the modified merchant Web page. The modified merchant Web page is displayed at the customer computer to allow the customer to purchase the product from the merchant. The merchant computer credits the virtual outlet for the purchase. Upon completion of the purchase, the customer computer displays the return Web page identified by the return link in the modified merchant Web page.

BRIEF DESCRIPTION OF THE DRAWINGS

FIG. 5 displays an example sign-up Web page.

FIG. 6 displays an example sign-up Web page.

FIG. 16 lists some of the information returned by the virtual outlet to the merchant during the sign-up process.

DETAILED DESCRIPTION OF THE INVENTION

Figure 1A:
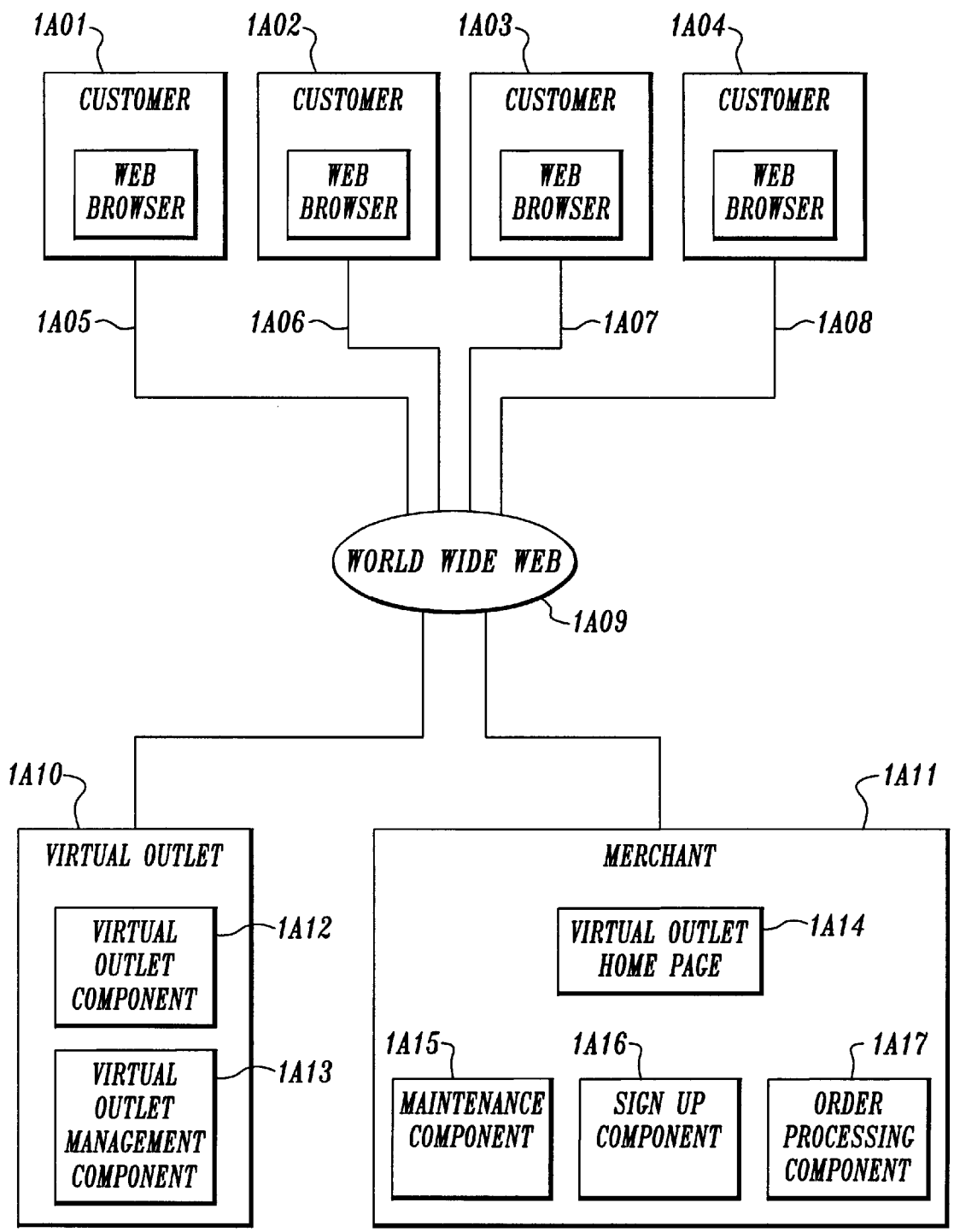
FIG. 1A is a block diagram illustrating a preferred computer system that includes the present invention.

A preferred embodiment of the invention provides a computer-based method and system for tracking transactions from a virtual outlet Web site to a merchant Web site on the Internet. The system of the present invention provides a sign up mechanism that allows a virtual outlet ("VO") owner to sign up to offer a merchant's products for sale through the VO. The system also provides a purchase mechanism that allows a customer to see what products are being offered for sale by the VO and to place an order directly with the merchant to purchase a product using the merchant Web site. The sign up and purchase mechanisms also allow the merchant Web site to automatically identify from which VO the customer gained access to the merchant Web site. The merchant Web site can then automatically track the VO (e.g., to pay a commission) and can then direct the customer computer to return to displaying a Web page of the VO Web site after the purchase is complete.

To purchase a product, a customer would first view a Web page provided by a VO. The VO Web page may show a graphical image of various products, such as a picture of a pair of blue jeans or a picture of a shirt. Each image has a URL associated with it that is a hot link to a Web page provided by the Web site of the merchant of the product. If a customer wishes to find more information about a product (e.g., cost or size information) or to purchase the product, the customer simply selects the image of the product displayed. When the image is selected, the customer computer then requests access to the merchant Web page identified by the associated URL. A merchant computer provides the merchant Web page to the customer computer. Once the customer computer receives the merchant Web page, it displays the Web page to the customer. Using the merchant Web page, the customer can view additional information about the product and purchase the product. After the order is placed, the merchant Web page directs the customer computer to redisplay a Web page of the VO. By redisplaying the VO Web page, the VO can help ensure that the customer will return to a Web page of the VO after the purchase of a product.

The URL that is used by the customer computer to access the merchant Web page includes a unique identification of the VO. The merchant Web site uses this unique identification for several purposes. First, the merchant Web site can track through which VO an order is placed and, for example, can pay the retailer a commission on the sale. Second, the merchant computer can store a return URL that identifies a VO Web page in association with the unique VO identification so that, upon completion of the order, the merchant's computer can direct the customer computer to the VO Web page identified by the return URL. Alternatively, rather than storing a return URL associated with the unique identification, a return URL can be sent as part of the URL used by the customer to access the merchant Web site. This URL is originally supplied to the customer as a hot link within the VO Web page that displays the image of the product that the customer is ordering from the merchant.

A virtual outlet relationship can be established and maintained with a merchant by accessing and interacting with the merchant VO set up Web page. This Web page contains links to additional Web pages that allow the prospective virtual outlet to conduct various transactions with the merchant. The prospective VO first establishes the relationship through a sign-up procedure. The VO provides the merchant with various information such as the VO's name, street address, email address, and design information (e.g., color scheme) of the VO Web site. The merchant computer accepts the information, the merchant considers whether a VO relationship should be established, and, if the merchant decides to establish the relationship, the merchant computer sends a confirmation back to the prospective VO. Once the relationship has been established, a representative of the VO can login to the merchant computer's account management component, which provides to the representative the ability to change the VO's password, to review and change account information, to browse the merchant's catalog to select items to sell, to change the merchant's order Web page display characteristics, and to perform other necessary tasks to maintain the retail relationship.

Although with the use of the merchant Web page it may be practical for a representative of a VO to access accounting information from a few merchants, such use becomes impractical as the number of merchants to which a VO has established a relationship increases. It would be very cumbersome to access, for example, a hundred different merchant Web pages to access accounting information. Consequently, a VO computer in one embodiment has a multi-merchant accounting system (MMAC). The MMAC can automatically collect accounting information from each merchant to which the VO has established a relationship. For example, the MMAC can, during off hours, download information relating to daily transactions from the merchant Web sites. The MMAC can collate and present the information from the merchants to a representative of the VO.

The establishing of a VO relationship solves problems of the existing compensation methods. First, because the merchant computer provides the customer with a return link to the VO's Web page, the VO can be relatively assured that the customer will return to the VO Web page after leaving the merchant Web page. Second, since the VO has access to the merchants' accounting Web pages, it can access information relating to its customers. Third, the URL supplied by the merchant to the VO to include in the VO Web page uniquely identifies the VO. For example, the merchant computer can have one Web page defined for each VO. When a customer accesses that Web page using the URL received from the VO, the merchant can track that it was a referral through the VO. Thus, the VO can be credited whenever the customer uses that URL even when a delayed purchase is made.

FIG. 1A is a block diagram illustrating a preferred system of networked computers that includes the present invention. The system includes a number of customer computers 1A01–1A04, a VO computer 1A10, and a merchant computer 1A11, which are interconnected on the WWW 109. Each customer computer has a WWW browser for accessing and displaying Web pages. The VO computer includes a virtual outlet component 1A12 that provides the Web pages of the virtual outlet to customers via the WWW, and a virtual outlet management component 1A13 that provides to a manager of the VO computer access to and display of the maintenance and sign-up Web pages of merchants. The merchant computer includes a virtual outlet home Web page component 1A14 that provides an initial Web page to the virtual outlet management component of the VO computer. From that initial Web page, the VO computer can access the Web pages provided by the maintenance component 1A15 and the sign-up component 1A16 of the merchant computer through the virtual outlet management component on the VO computer. The merchant computer also includes an order processing component 1A17 that provides order Web pages directly to customer computers via the network.

FIG. 1A shows a simple system that displays the various aspects of the invention. However, the invention may be employed on a very large variety of systems and network topologies. A much larger number of customer computers than shown in FIG. 1A would be desirable, of course, as well as a large number of virtual outlets and merchants. Virtual outlets, merchants, and customers need not reside on separate computers, but could reside together on one or more computers, provided that each has an Internet address. They can also be on an intra-net computer network.

Figure 1B:
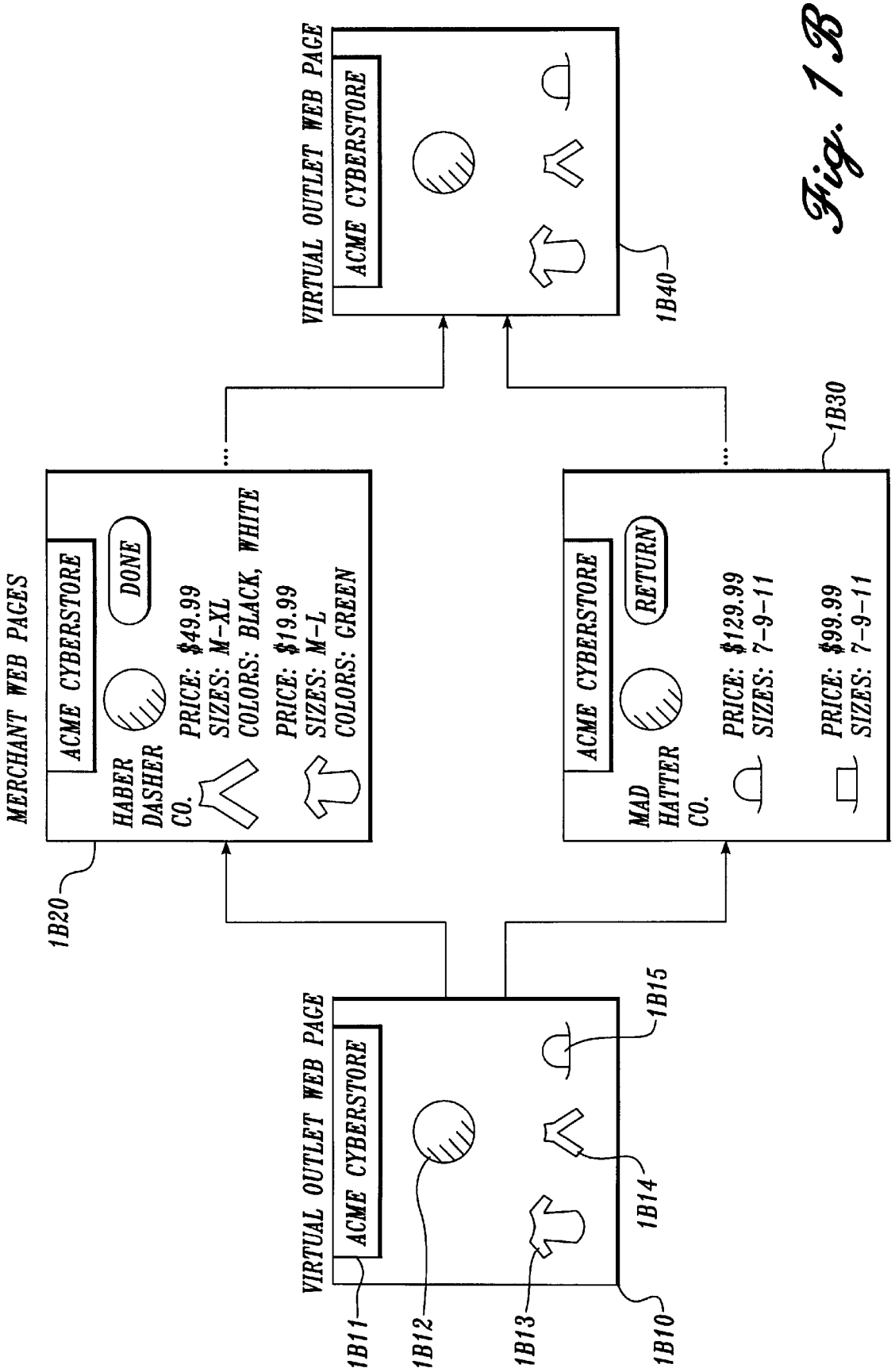
FIG. 1B illustrates the sequence of Web pages as seen by a customer of a virtual outlet.

FIG. 1B illustrates the sequence of Web pages as seen by a customer of a VO. In this example, the name of the VO is "AcmeCyberstore;" its logo is a circle with lines; and it is offering to sell shirts, pants, and hats. The shirt and pants are sold through a merchant named "HaberDasher Company," and the hats are sold through a merchant named "MadHatter Company." When a customer accesses the Web page for the AcmeCyberstore, the customer would see Web page 1B10. This Web page contains banner 1B11 and logo 1B12, which identify the VO. In addition, this Web page contains the images 1B13, 1B14, and 1B15 of the products that are being offered for sale. When a customer selects a product to purchase (or to view product information), the browser accesses the Web page for the merchant that sells the product. The Web page is identified by a URL (i.e., hotlink) associated with that product. For example, the shirt image 1B13 may have the URL "http://WWW.HaberDasher.com/?AcmeCyberstore&AcmeCyberstore.com/home page&hat" associated with it. The portion "HaberDasher.com" identifies the merchant that sells the shirt, the portion "AcmeCyberstore" identifies the VO, and the portion "AcmeCyberstore.com/homepage" identifies the Web page to return to after the sale is complete. (If a return Web page is not identified, the merchant can use a default return Web page for that virtual outlet.) When the merchant computer for the HaberDasher Company receives this URL, it accesses a database established when the AcmeCyberstore established a virtual outlet relationship with the HaberDasher Company. That database specifies a Web page layout that is preferably a layout similar to that of the Web page for the AcmeCyberstore. For example, the layout may indicate the contents of the banner, logo, and background color of the Web page. The merchant computer then dynamically creates a Web page (e.g., an HTML file) in accordance with the layout and associates the return URL with an icon on the Web page. The merchant computer then sends that Web page to the customer computer. The customer computer displays the merchant Web page 1B20, 1B30. The merchant Web page may allow the representative to browse through various other Web pages to collect information (e.g., delivery address or credit card number) relating to the purchase. When the customer has completed the purchase, the customer can select the return icon to return to the Web page 1B40 for the AcmeCyberstore VO.

The Virtual Outlet

The virtual outlet component of the VO provides Web pages to customers that comprise a collection of text or images that describe or represent various products or services that the customer can purchase. Those text descriptions or images that represent items to be ordered from a merchant are associated on the VO Web page with hot links that allow a customer to directly access a merchant's order Web page. The hot links include, in the scheme-specific portion of the URL, sufficient information for the merchant to identify the VO through which the customer accessed the merchant Web page, so that the merchant can credit to the VO an appropriate commission if a sale is made, and so that the merchant can return to the customer computer a reference to the appropriate VO Web page, which should be displayed to the customer once the order transaction is complete.

Figure 2:
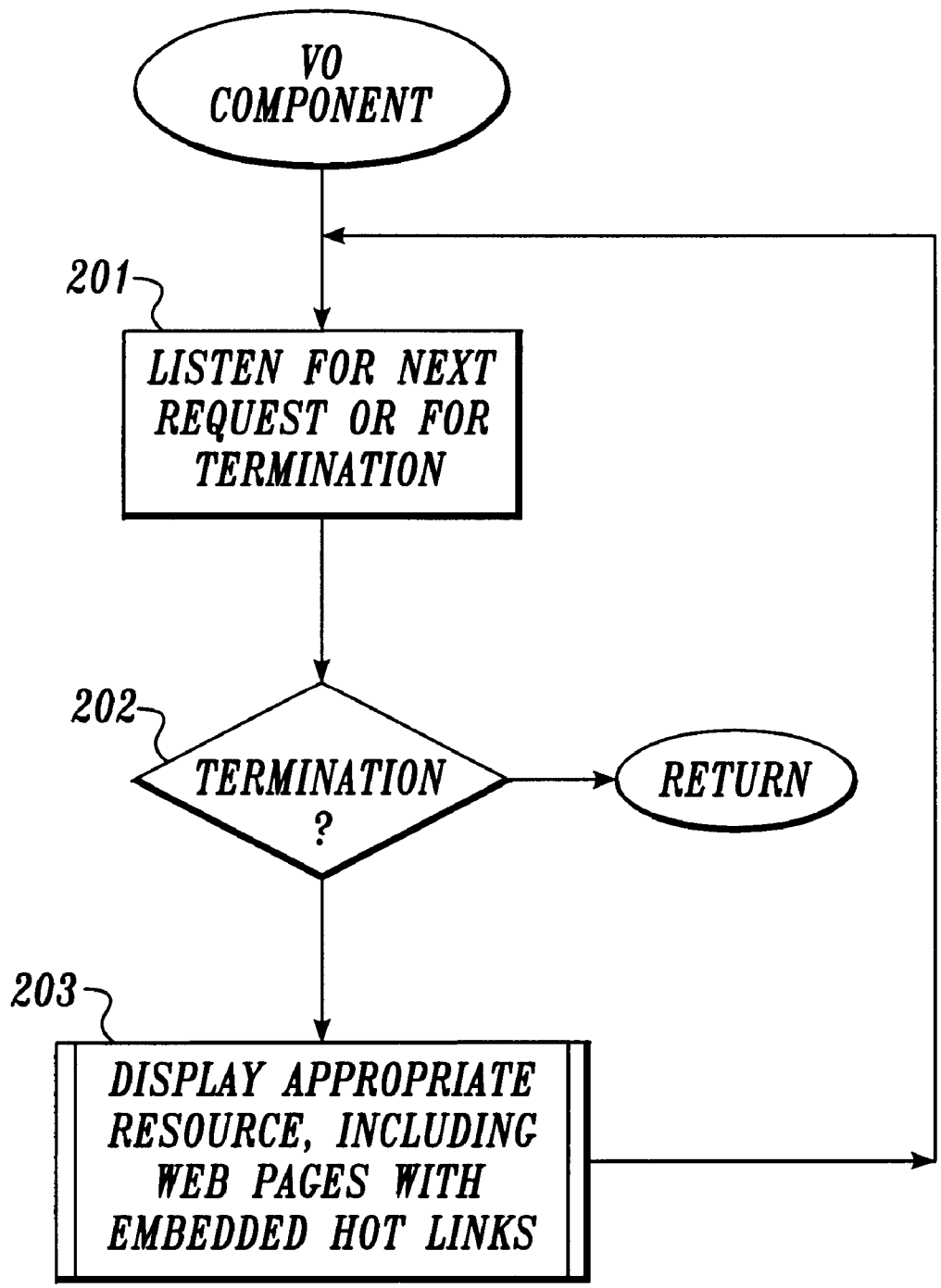
FIG. 2 displays a flow diagram for the virtual outlet component of the virtual outlet.

A flow diagram for the virtual outlet component of the VO is shown in FIG. 2. The virtual outlet component is a WWW server. In step 201, the virtual outlet component listens for a request from a customer identified by a URL. In step 202, if the request is to terminate, the virtual outlet component terminates. In step 203, the virtual outlet component sends to the customer's computer the requested VO Web page or requested resource, such as a graphics file. Because WWW servers are stateless, there is no connection maintained for customers that spans individual requests for resources. The HTML file defining a VO Web page may contain hot links to merchant order Web pages. Each hot link identifies a merchant order Web page and the VO, and optionally a return VO Web page.

The virtual outlet management component of the VO allows a VO to enter into a VO relationship with a merchant and to manage the relationship over time. The virtual outlet management component may simply comprise a browser through which the retailer accesses the merchant Web pages that provide management and sign-up facilities.

Figure 3:
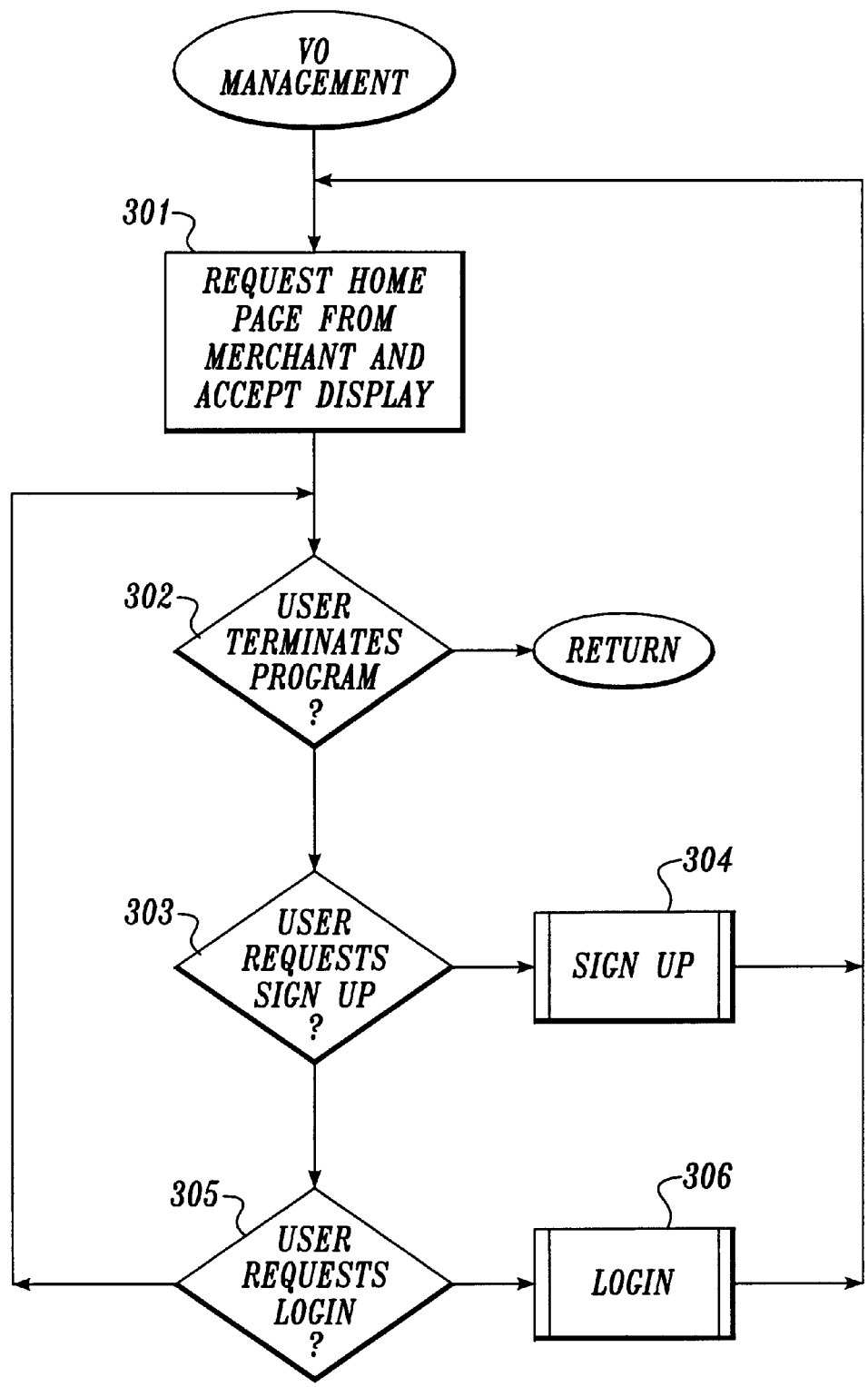
FIG. 3 displays a high-level flow control diagram for the virtual outlet management component of the virtual outlet.

FIG. 3 displays a high-level flow control diagram for the virtual outlet management component of the VO. In step 301, the virtual outlet management component ("VOMC") requests the home page, or initial Web page, provided by the merchant computer to the VO from which to navigate to the various Web pages in order to conduct retail relationship management tasks and to conduct the initial retail relationship sign-up. The VOMC then displays the initial merchant Web page to the representative of the VO. As part of step 301, the representative indicates with which merchant the VO wishes to interact. This information may be requested from the representative. Alternatively, the VOMC may provide the representative with a list of options from which to select a merchant. The initial merchant Web page includes input means for the representative to select to exit from the VOMC, to establish a relationship, or to login to an established account in order to conduct various maintenance transactions. If the VOMC detects that the representative has indicated a desire to exit from the VOMC in step 302, the VOMC simply returns. If the VOMC detects in step 303 that the representative wishes to establish a relationship with the merchant, the VOMC calls the Sign-up routine in step 304. If the VOMC detects, in step 305, that the representative wishes to login to an established account, the VOMC calls the Login routine in step 306.

Figure 4:
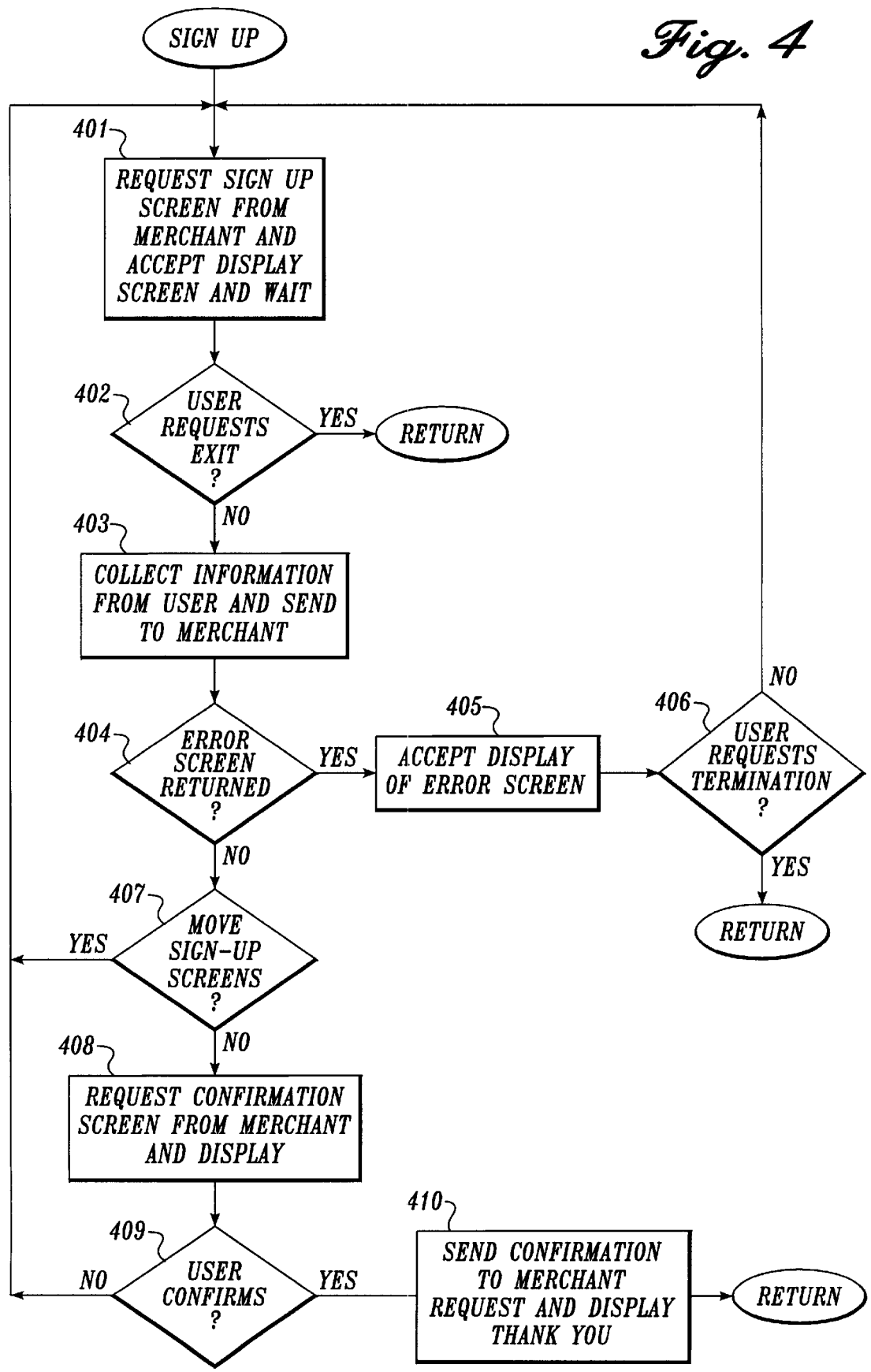
FIG. 4 displays a flow diagram for the Sign-up routine.

FIG. 4 displays a flow control diagram for the Sign-up routine. In step 401, Sign-up requests the sign-up Web page, or initial sign-up Web page, if there are more than one, provided by the merchant computer to the VO for collection of sign-up information from the VO. When the requested Web page is received from the merchant computer, Sign-up displays the sign-up Web page.

FIGS. 5 and 6 display example sign-up Web pages. The Web page of FIG. 5 inputs such information as the mailing address and email address of the VO, as well as a proposed password for use if the merchant decides to establish a relationship with the VO. The Web page of FIG. 6 inputs information concerning the appearance that the VO expects for a merchant order Web page that will be displayed when a customer hot links through the VO to the merchant site. This information includes a URL for a graphics file that contains the VO's logo, the desired background color, and other such information.

If the representative indicates that the representative wishes to exit from Sign-up, then Sign-up detects the indication in step 402 and returns. Otherwise, when the representative has completed inputting information to the sign-up Web page, and indicates that it should be returned to the merchant, Sign-up returns the collected information to the merchant computer via the Internet in step 403. If the information returned to the merchant contains errors, then either the merchant may return an error Web page or Sign-up might detect the error locally and display an error screen. In either case, if the error Web page or screen needs to be displayed, as detected in step 404, Sign-up displays an error Web page or screen in step 405 and then either returns to step 401 to allow the representative to re-input data to the sign-up Web page or returns altogether, depending on the representative's request in response to the error Web page or screen, as detected by Sign-up in step 406. If more than one sign-up Web page is necessary, as in the example of FIGS. 5 and 6, then Sign-up determines in step 407 whether to return to step 401 to request the next sign-up Web page. If Sign-up has displayed all the sign-up Web pages and collected input from them and returned the input to the merchant computer, then Sign-up requests a confirmation Web page from the merchant in step 408 and displays it to the representative.

Figure 7:
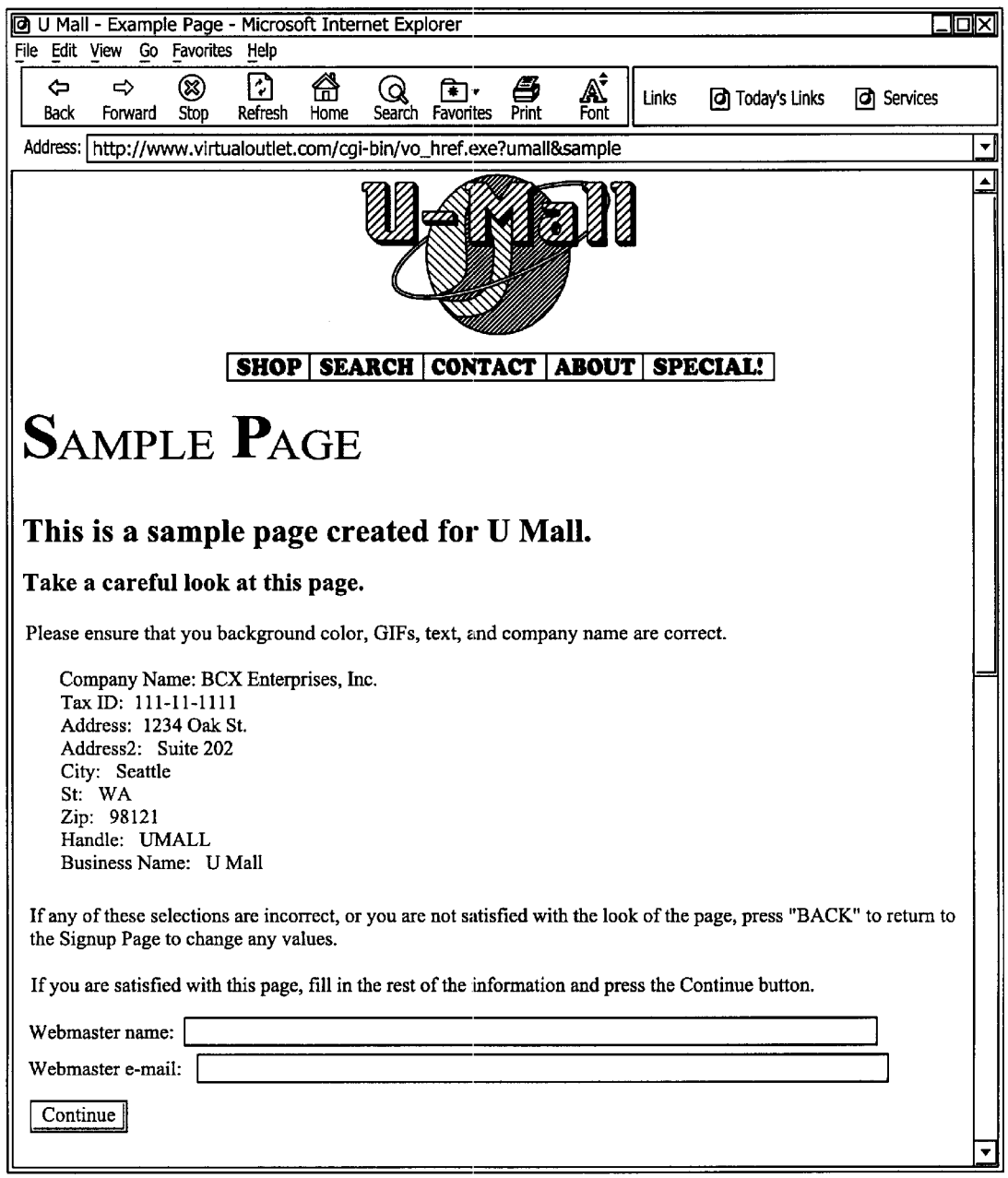
FIG. 7 displays an example confirmation Web page.

An example confirmation Web page is displayed in FIG. 7. The example confirmation Web page repeats certain of the supplied sign-up information and displays the appearance requested by the representative for the merchant order Web page, including colors and fonts. If the representative finds the confirmation Web page acceptable and indicates a desire to confirm the sign-up request, then Sign-up detects the indication in step 409, sends a confirmation message to the merchant via the Internet and requests and displays a thank you message from the merchant in step 410, and returns. Otherwise, Signup returns from step 407 to step 401 to allow the representative to re-input data to the sign-up Web pages.

Alternate designs may include many of the screens displayed by the VOMC locally within the VOMC, rather than require them to be requested and received from the merchant computer, so that the merchant computer might only send an indication of what screen to display, rather than a Web page representing the screen. Certain error screens might, for example, be contained within the VOMC.

Figure 8:
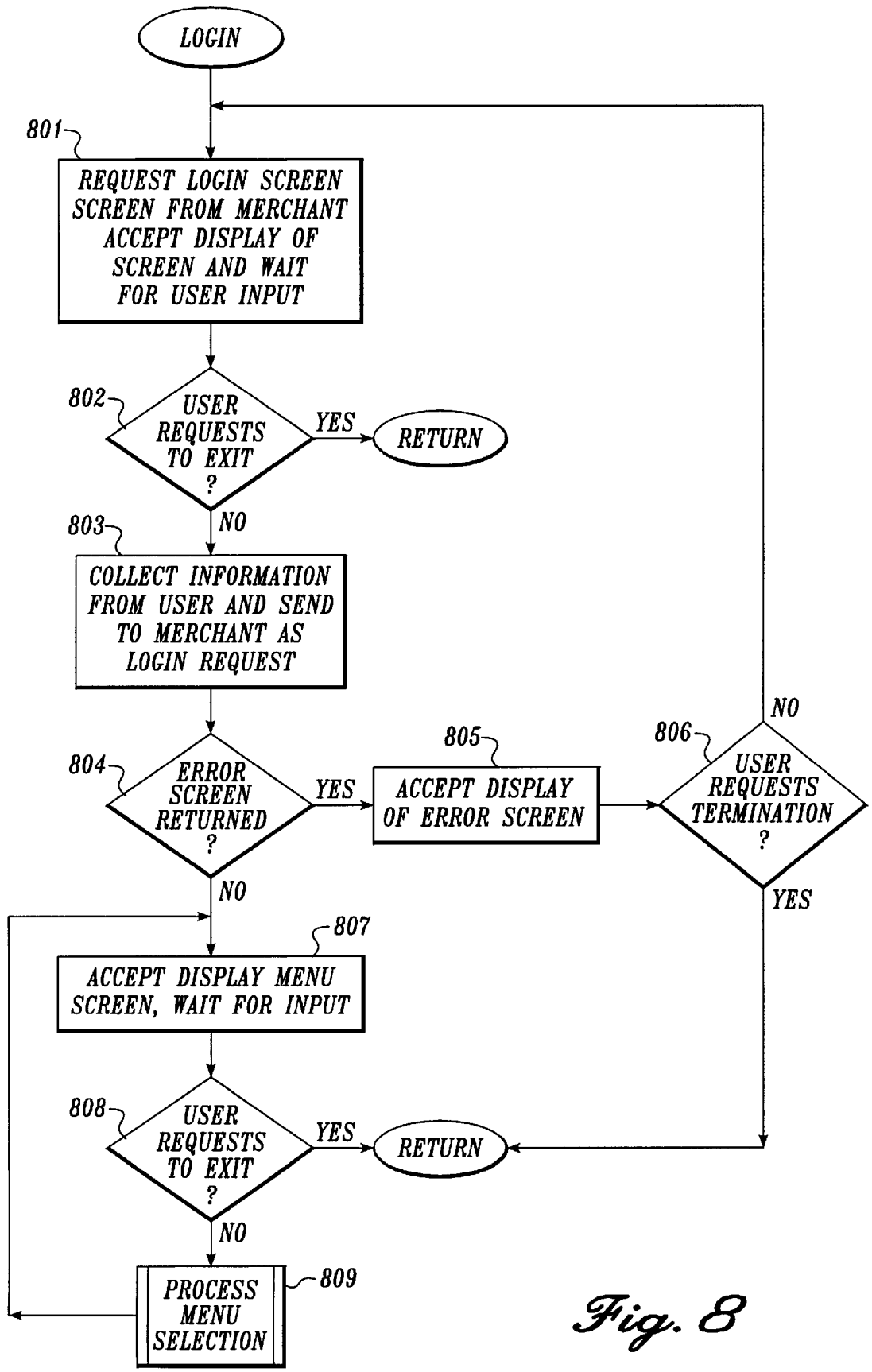
FIG. 8 shows a flow control diagram for the Login routine.

FIG. 8 displays a flow diagram for the Login routine called in step 306 of FIG. 3. In step 801, Login requests from the merchant a login Web page, receives the login Web page from the merchant computer, displays it to the representative, and waits for representative input. If the representative requests to exit from Login, Login detects the exit request in step 802 and returns. Otherwise, Login receives input from the representative to the Login Web page, commonly including at least a password, and returns the information to the merchant computer via the Internet in step 803. If the merchant computer does not accept the login request, then the merchant computer returns an error Web page or indication of an error to Login, which Login detects in step 804, and in response to which Login displays an error screen in step 805. The representative can choose to either terminate Login or to return to the login Web page, as detected by Login in step 806. If the login request is accepted by the merchant computer, then the merchant computer returns to Login a menu Web page, and Login displays the menu in step 807, waiting for the representative to select a transaction type or to exit from Login. If an exit is requested, Login detects the exit request in step 808 and returns. Otherwise, Login calls Process_Menu_Selection in step 809 to process the representative's selection from the displayed menu.

Figure 9:
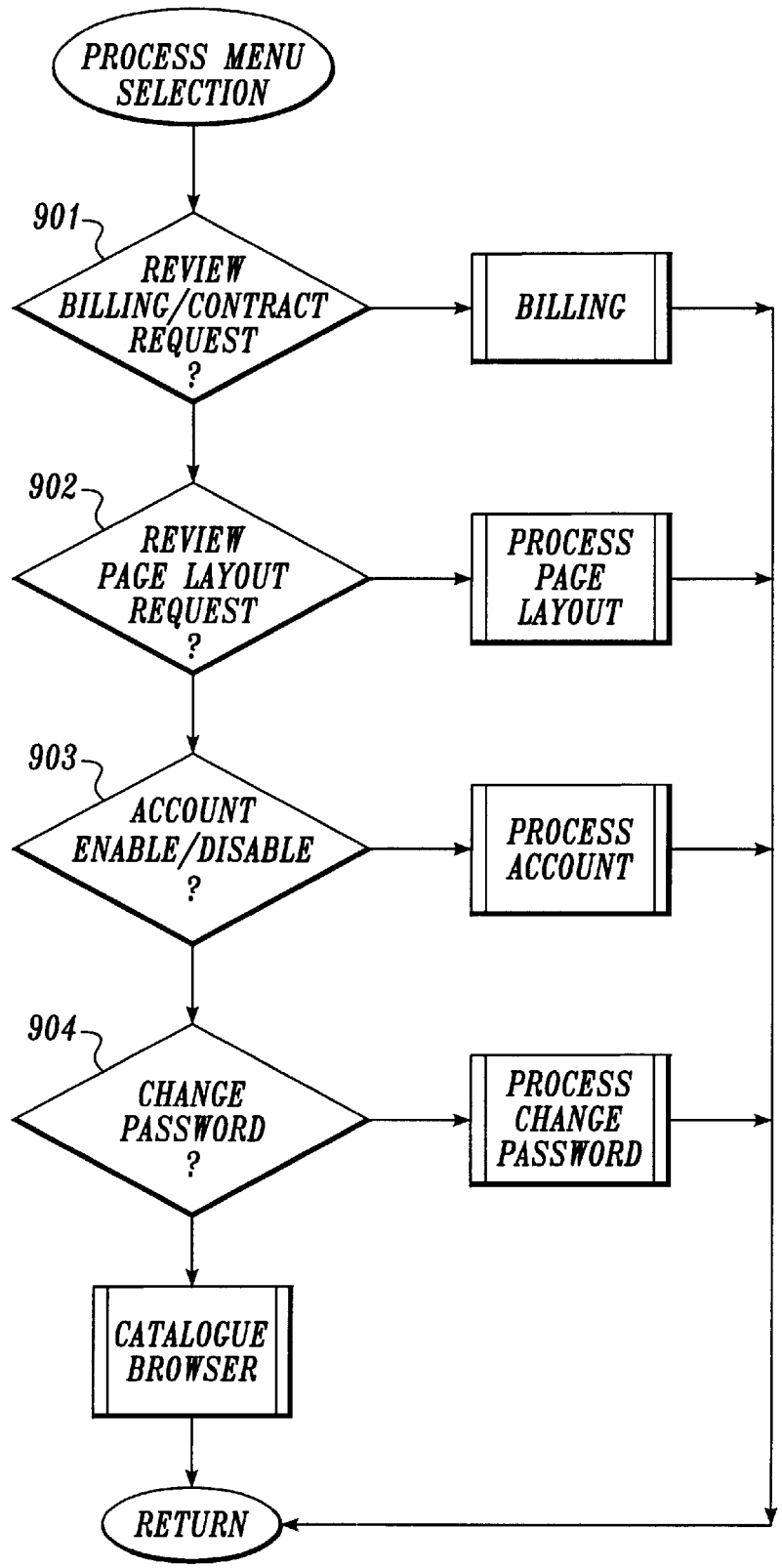
FIG. 9 shows a flow control diagram for Process_Menu_Selection.

A flow diagram for the routine Process_Menu_Selection is displayed in FIG. 9. Steps 901–904 represent a multi-branch selection by which Process_Menu_Selection calls the appropriate routine in response to the representative's selection from the menu displayed in step 807 of FIG. 8. Process_Menu_Selection calls any of the following routines, depending on the representative's selection: (1) Billing; (2) Process_Page_Layout; (3) Process_Account; (4) Process_Change_Password; and (5) Catalog_Browser. Billing provides a means for a VO representative to review and change the billing information or the contract between the VO and the merchant. The flow diagram for Billing is described below. The three process routines (2), (3), and (4) provide to the VO representative a means to change the order Web page characteristics, to enable and disable the retail relationship, and to change the VO's password, respectively. A flow diagram that abstractly represents the form of these routines is described below.

Figure 10:
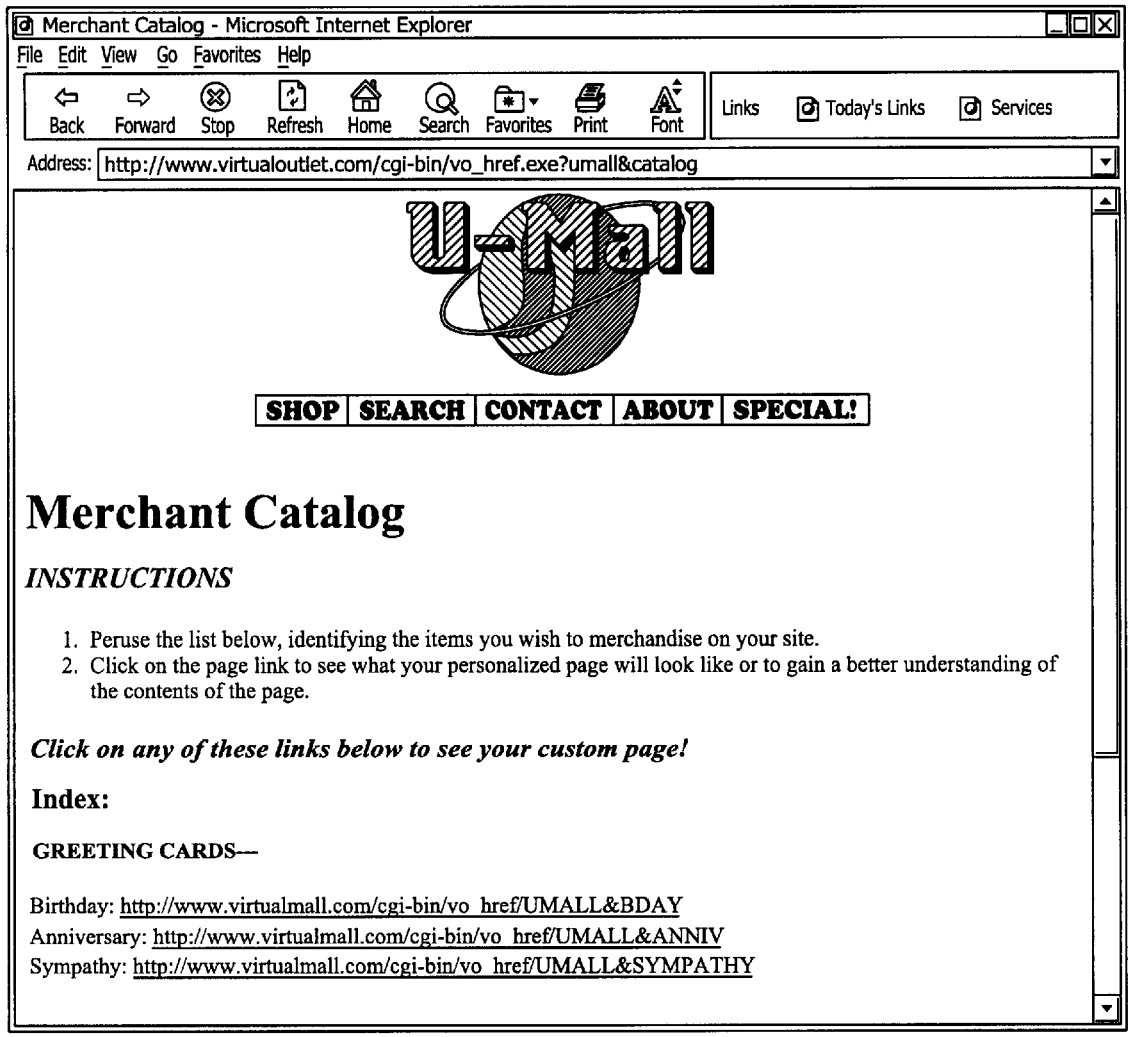
FIG. 10 shows an example merchant catalog Web page.

The Catalog_Browser routine allows a VO representative to browse through catalog Web pages supplied by the merchant. FIG. 10 shows an example catalog Web page. Items for sale are described and listed along with URLs corresponding to the order Web page that the merchant will supply to a customer linking through a VO Web page to the merchant site in order to purchase the item. The VO may incorporate items into the VO Web pages by including the URLs obtained from the merchant's catalog as hot links in the VO Web pages. The Catalog_Browser is a simple browser that requests catalog Web pages through hypertext-like links, and is not described further.

Figure 11:
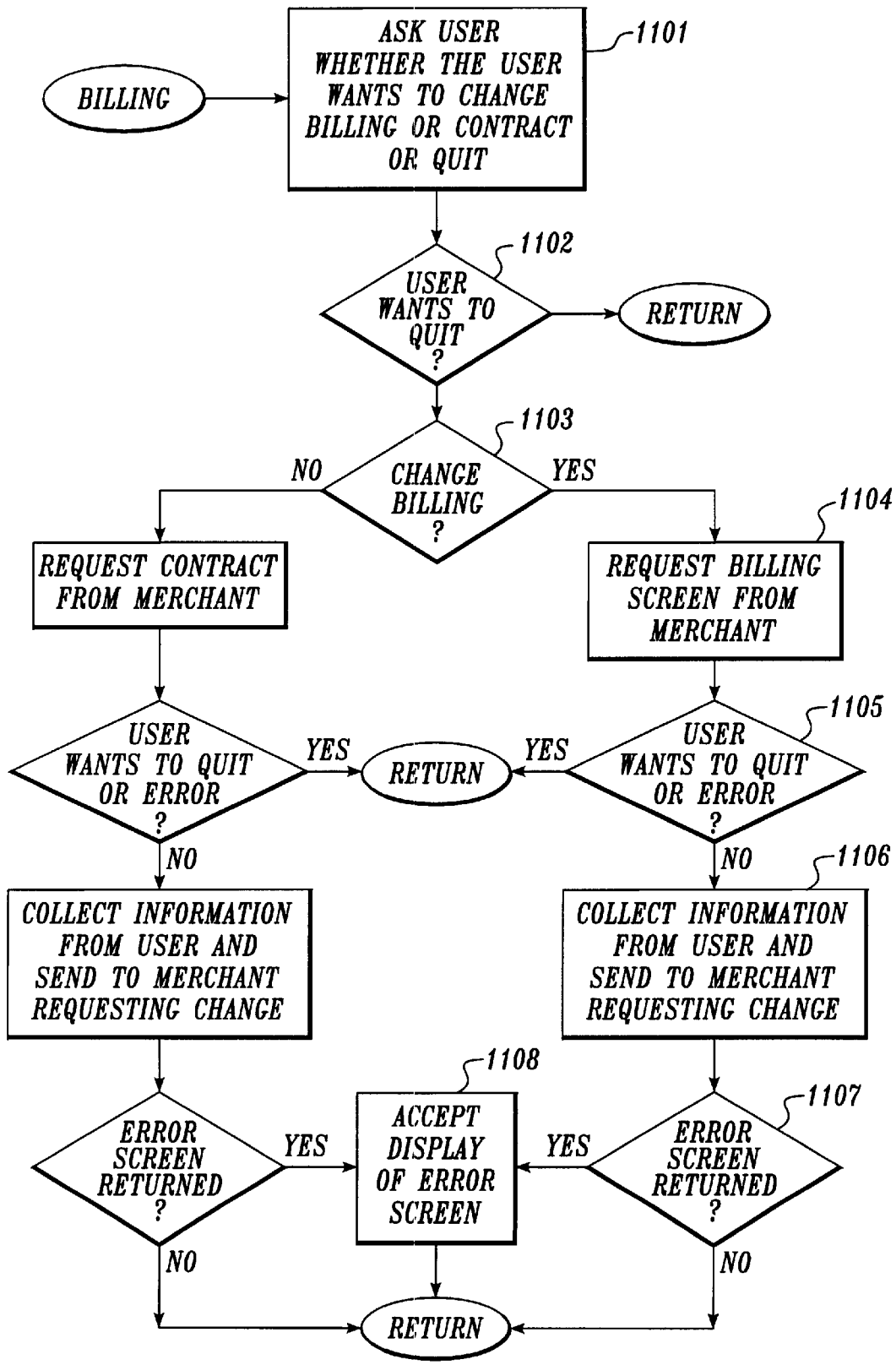
FIG. 11 shows a flow control diagram for the routine Billing.

FIG. 11 displays a flow control diagram for the routine Billing, called from Process_Menu_Selection. Billing contains two parallel paths, one for changing the contract, and one for changing billing information. Because they are similar, only the latter will be described. In step 1101, Billing seeks an indication from the representative as to whether the representative wishes to change the contract or billing information or terminate the transaction. If the representative wishes to terminate, that indication is detected by Billing in step 1102 and Billing returns. Otherwise, Billing determines whether the billing information or contract is to be changed, and, in step 1103, chooses the appropriate path. If the representative indicated a desire to change the billing information, Billing proceeds to step 1104 to request a billing Web page from the merchant that displays current billing information and allows the representative to change the information. In step 1105, Billing determines if the representative wishes simply to terminate the transaction after reviewing the billing information, and, if so, returns. Otherwise, in step 1106 Billing collects changes from the representative and sends the collected information via the Internet to the merchant computer. The merchant computer may return an error indication or an error Web page in response to receiving the information, in which case Billing displays an error screen in step 1108 after detecting the error in step 1107. Billing then returns. Alternatively, Billing could return to step 1101 in case of an error to allow the representative to re-input changes.

Figure 12:
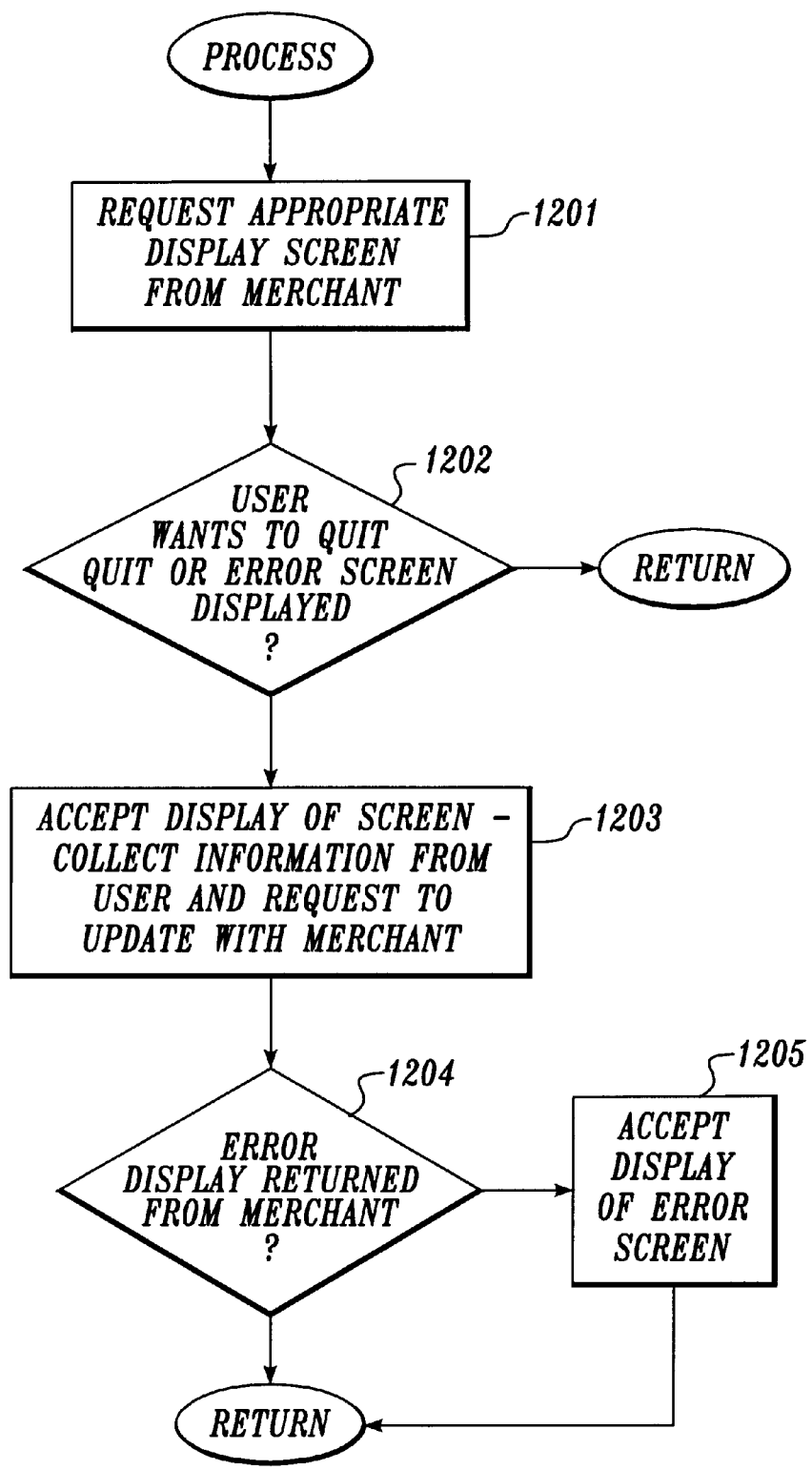
FIG. 12 shows a flow control diagram for the routine Process.

FIG. 12 displays a flow control diagram for the abstract routine Process that describes the processing routines Process_Page_Layout, Process_Account, and Process_Change_Password. In step 1201, Process requests the appropriate display Web page from the merchant computer, receives the display Web page, and displays the display Web page to the representative. If Process detects that the representative wishes to terminate the transaction in step 1202, Process returns. Otherwise, Process collects information representing changes that the representative wishes to make, either to the Web page layout, the password, or the status of the account, and sends the changes back to the merchant computer in step 1203. The merchant computer may return via the Internet an indication of an error or an error Web page, which Process detects in step 1204 and then displays an error screen in step 1205. Process then returns. Alternatively, in case of an error, Process could return to step 1201 to allow the representative to re-input change information and resubmit the information to the merchant computer.

The Merchant System

The VO home page component of the merchant portion of the VO system provides one or more Web pages to VOs that may contain general information about the merchant and the merchant's products and services, and provide directions for the VO for accessing the sign-up and maintenance components. After viewing the home page, a VO representative may decide to attempt to enter a VO relationship with the merchant by invoking the sign-up procedure.

The sign-up component of the merchant system is the counterpart to the Sign-up procedure of the maintenance component of the VO. The sign-up component allows a VO to supply information to the merchant that the merchant uses to evaluate whether to enter into a VO retail relationship with the VO.

The maintenance component of the merchant is the counterpart to the login and maintenance procedures made available to the VO by the maintenance component of the VO. This component supports login requests from VOs, and, following successful logins, a range of maintenance functions for updating account information, changing the password assigned to the VO, and browsing the merchant's catalog.

The order processing component of the merchant system handles order requests that come directly from customers browsing the VO. By clicking on an item displayed on a VO Web page, the customer directs his or her Web browser to request a Web page directly from the merchant computer, and display it on the customer's display device. The customer continues requesting Web pages from the merchant and displaying them until the customer has completed the ordering sequence, and then returns to viewing the VO Web page on which the ordered item was originally displayed.

Figure 13:
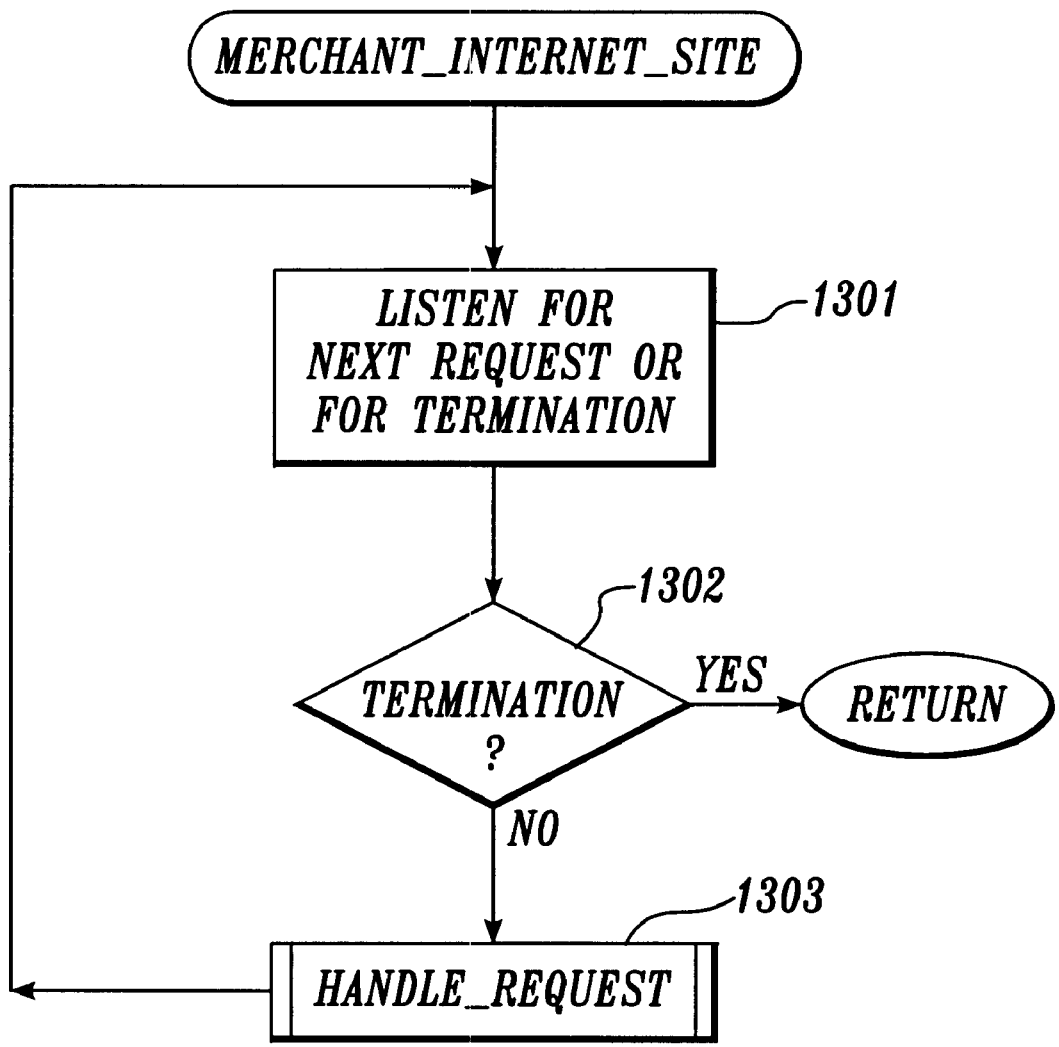
FIG. 13 shows a flow control diagram for the merchant portion of the virtual outlet retailing system.

FIG. 13 displays a high-level flow control diagram for the merchant system. The merchant system runs as an Internet server, listening for and handling requests from VO and customer clients. In step 1301, the merchant system listens for the next request from the Internet, or for a termination request from a representative of the merchant computer. When a request is detected, processing proceeds to step 1302. If a termination request is detected, in step 1302, the merchant system returns, ending execution of the merchant program. Otherwise, in step 1303, a VO or customer request from the Internet is processed by calling the routine Handle_Request.

Figure 14:
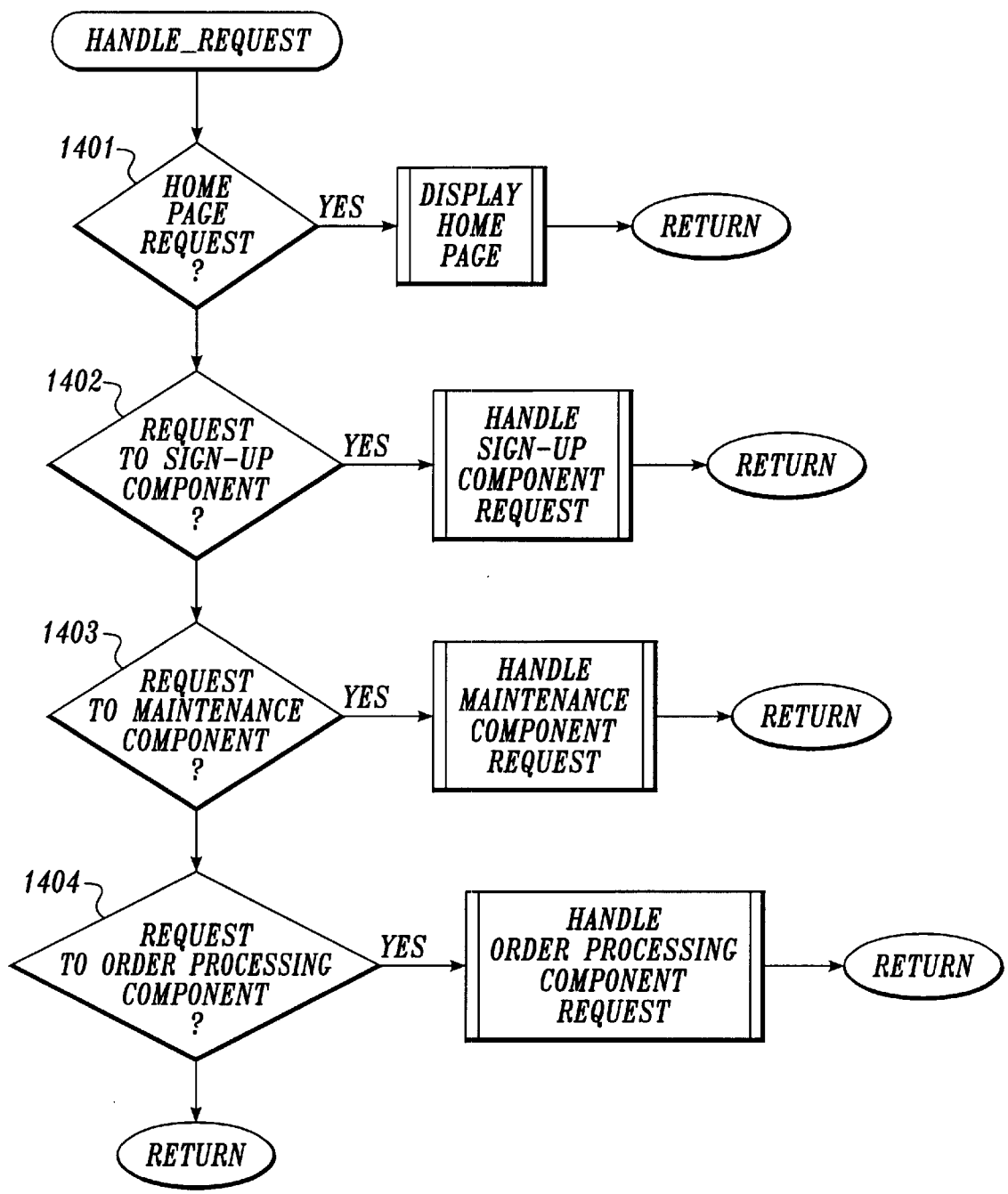
FIG. 14 shows a flow control diagram for the routine Request.

FIG. 14 displays a flow diagram for the routine Handle_Request. Handle_Request determines what type of request has been received from the Internet, and then calls an appropriate routine to handle the request. If Handle_Request determines, in step 1401, that the received request is for display of the home page, then Handle_Request calls Display_Home_Page to send the requested home page to the VO that made the request. Display_Home_Page simply retrieves the HTML file describing the home page from the file system of the merchant computer and sends it via the Internet to the requesting VO. Display_Home_Page will not be described further. If Handle_Request determines, in step 1402, that the received request concerns the merchant sign-up component, then Handle_Request calls Sign-up_Request to process the request. If Handle_Request determines, in step 1403, that the received request concerns the merchant maintenance component, then Handle_Request calls Maintenance_Request to process the request. If Handle_Request determines, in step 1404, that the received request concerns the merchant order processing component, then Handle_Request calls Order_Processing_Request to process the request. Otherwise, Handle_Request returns, having failed to identify the type of the request received from the Internet.

The Merchant Sign-up Component

Figure 15:
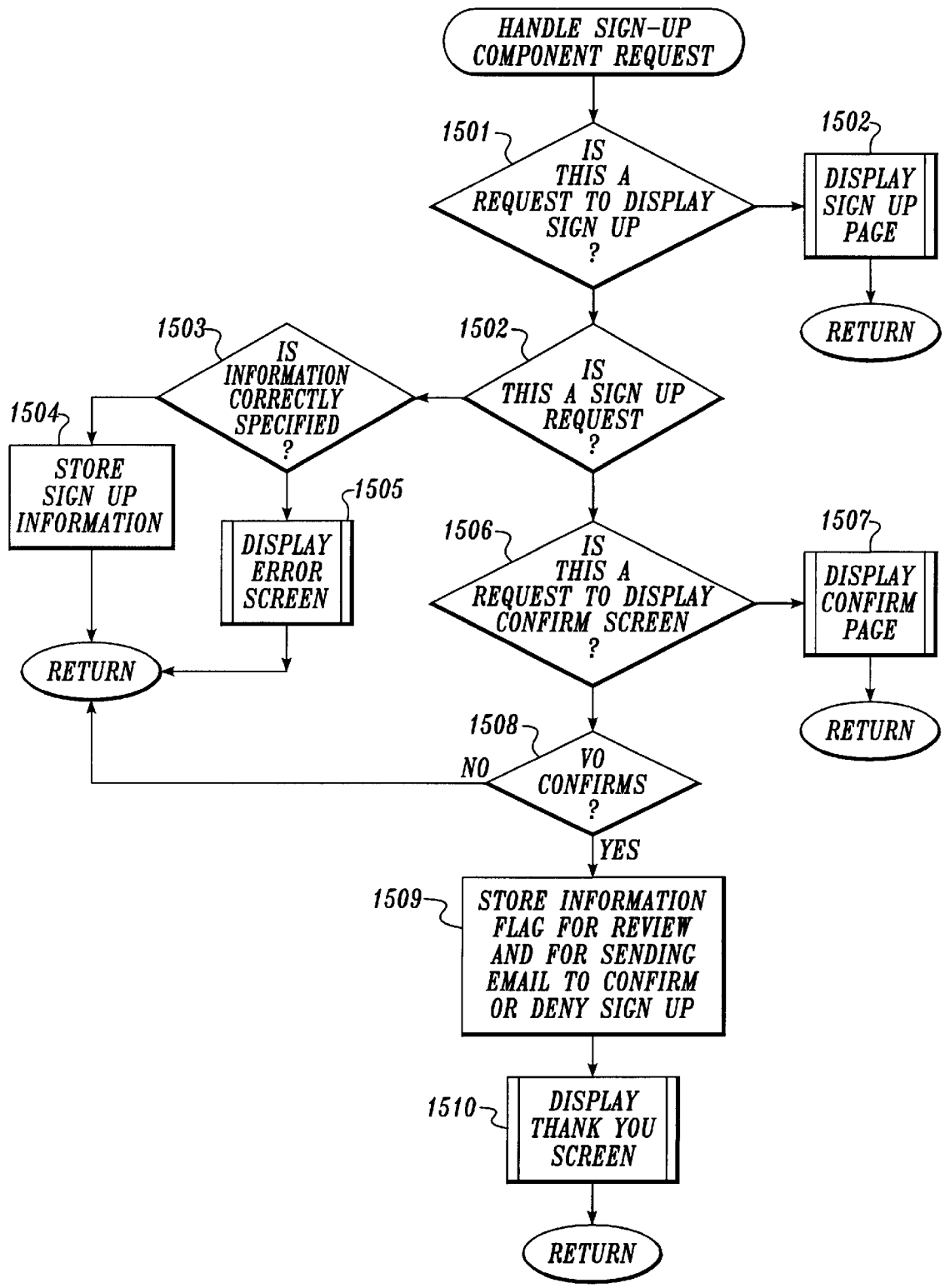
FIG. 15 shows a flow control diagram for the Sign-up_Request routine.

FIG. 15 displays a flow diagram for the Sign-up_Request routine. In step 1501, Sign-up_Request determines if the received request was for the display of a sign-up Web page at the VO. If so, Sign-up_Request calls, in step 1502*a* Display_Sign-up_Screen to send the description of the requested sign-up Web page to the VO, and then returns. Otherwise, Sign-up_Request determines, in step 1502*b*, whether the received request was to store sign-up information elicited from the VO by a displayed sign-up Web page. If so, Sign-up_Request determines in step 1503 whether the information was correctly specified. If the information was correctly specified, Sign-up_Request temporarily stores the sign-up information in a file on the merchant computer in step 1504 and returns. If the information was not correctly specified, Sign-up_Request sends an error screen to the requesting VO in step 1505 before returning. FIG. 16 lists example information returned by the VO to the merchant during the sign-up process. In step 1506, Sign-up_Request determines whether the received request was a request to display the confirmation Web page to the representative of the VO maintenance component. If so, Sign-up_Request calls Display_Confirm_Screen in step 1507 to look up the stored information received during earlier stages of the sign-up process from the VO, prepares a confirmation Web page in the style specified by the VO for order processing Web pages, including specified logos, graphics, colors, and text fonts, and then sends a description of the confirmation Web page to the VO for display. Sign-up_Request processes a request from a VO to confirm the sign-up in step 1508 after the representative of the retailer computer has reviewed the confirmation Web page. In step 1509, sign-up_Request permanently stores the sign-up information on the merchant computer and flags the stored information for review by a representative of the merchant computer. If the representative of the merchant computer decides to extend to the VO a VO relationship, then the merchant will send an email to the VO to notify the VO of the establishment of the relationship and will activate the account so that the VO can subsequently login to the merchant maintenance facilities. Finally, in step 1510, Sign-up_Request sends a thank you Web page to the VO to end the sign-up session.

Merchant Maintenance Component

Figure 17:
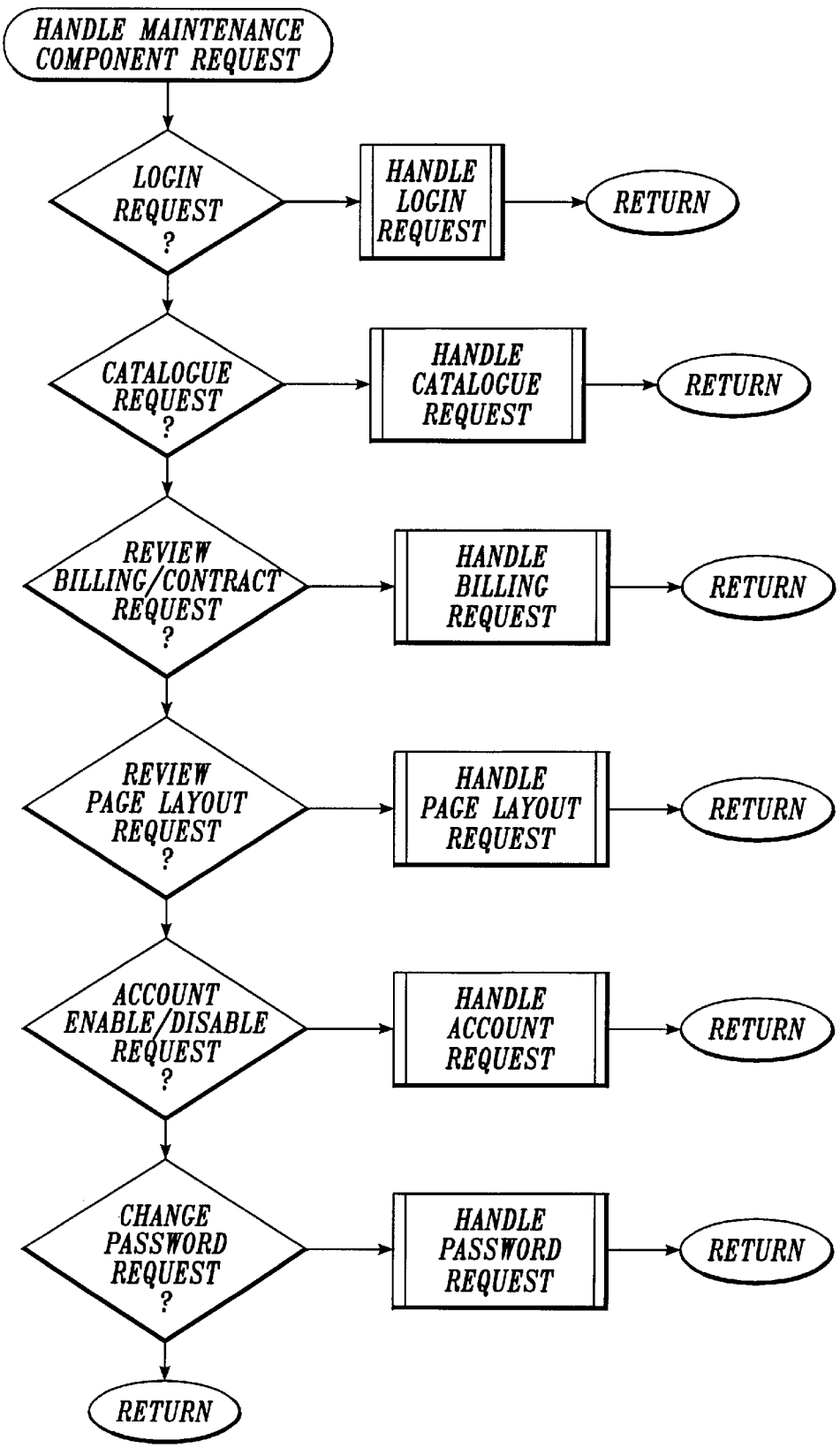
FIG. 17 shows a flow control diagram for the routine Maintenance_Request.

FIG. 17 displays a control flow diagram for the routine Maintenance_Request. This routine determines what type of maintenance component has been received from a VO, and calls an appropriate routine to handle that type of request. These called routines include Login_Request, Catalog_Request, Billing_Request, Page_Layout_Request, Account_Request, and Password_Request.

Figure 18:
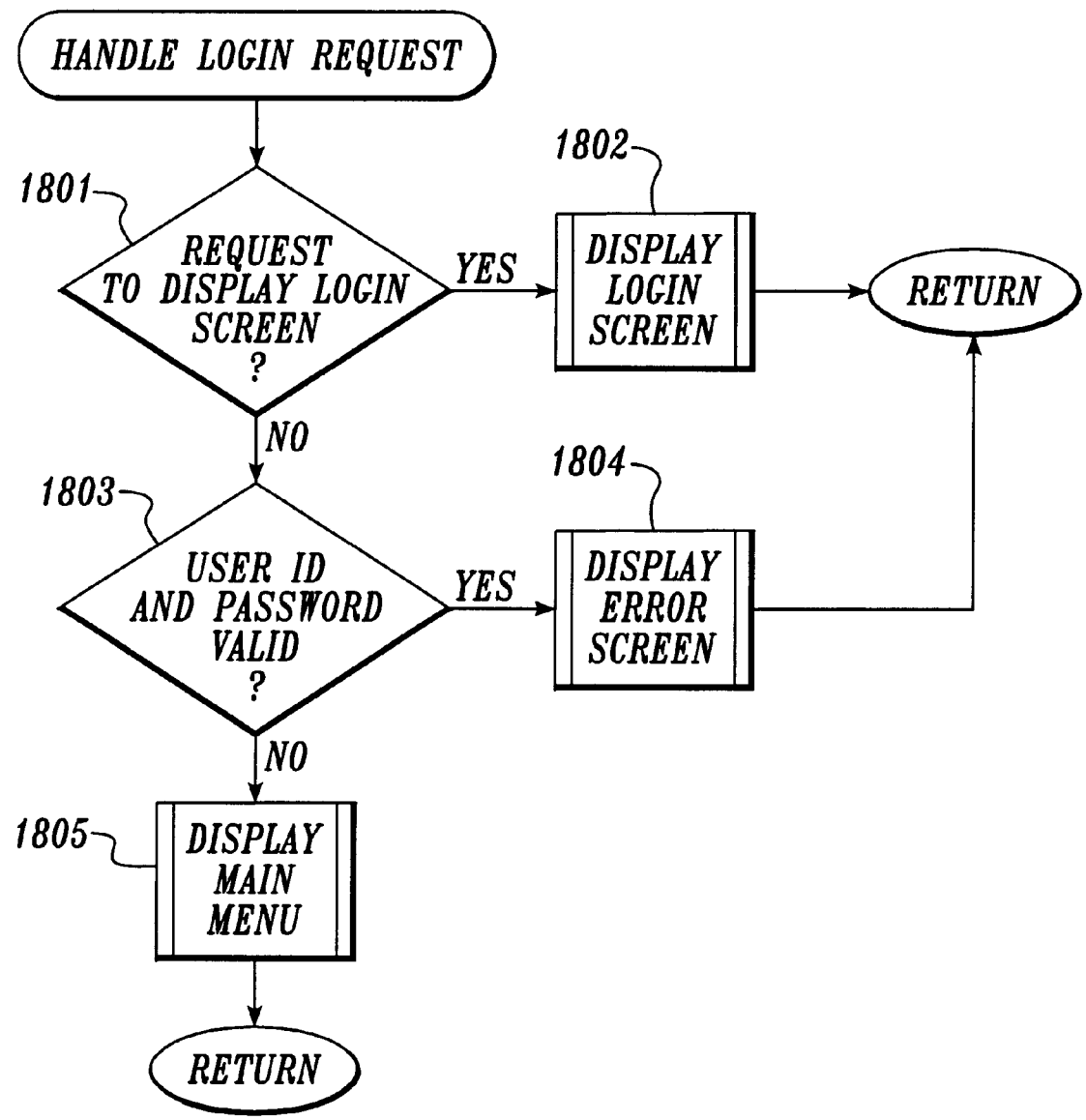
FIG. 18 shows a flow control diagram for the routine Login_Request.

FIG. 18 displays a flow diagram for the routine Login_Request. In step 1801, Login_Request determines whether the received request was a request to display the login Web page. If so, Login_Request in step 1802 calls the routine Display_Login_Screen to retrieve the description of the login Web page and send it to the requesting VO, where it is then displayed. Otherwise, Login_Request processes a login request starting with step 1803. If the VO ID and password supplied as part of the login request are valid and correspond to the Internet address of the requesting VO, then Login_Request calls Display_Main_Menu in step 1805 to send the main menu Web page to the requesting VO. Otherwise, Login_Request sends an error screen to the requesting VO in step 1804.

Figure 19:
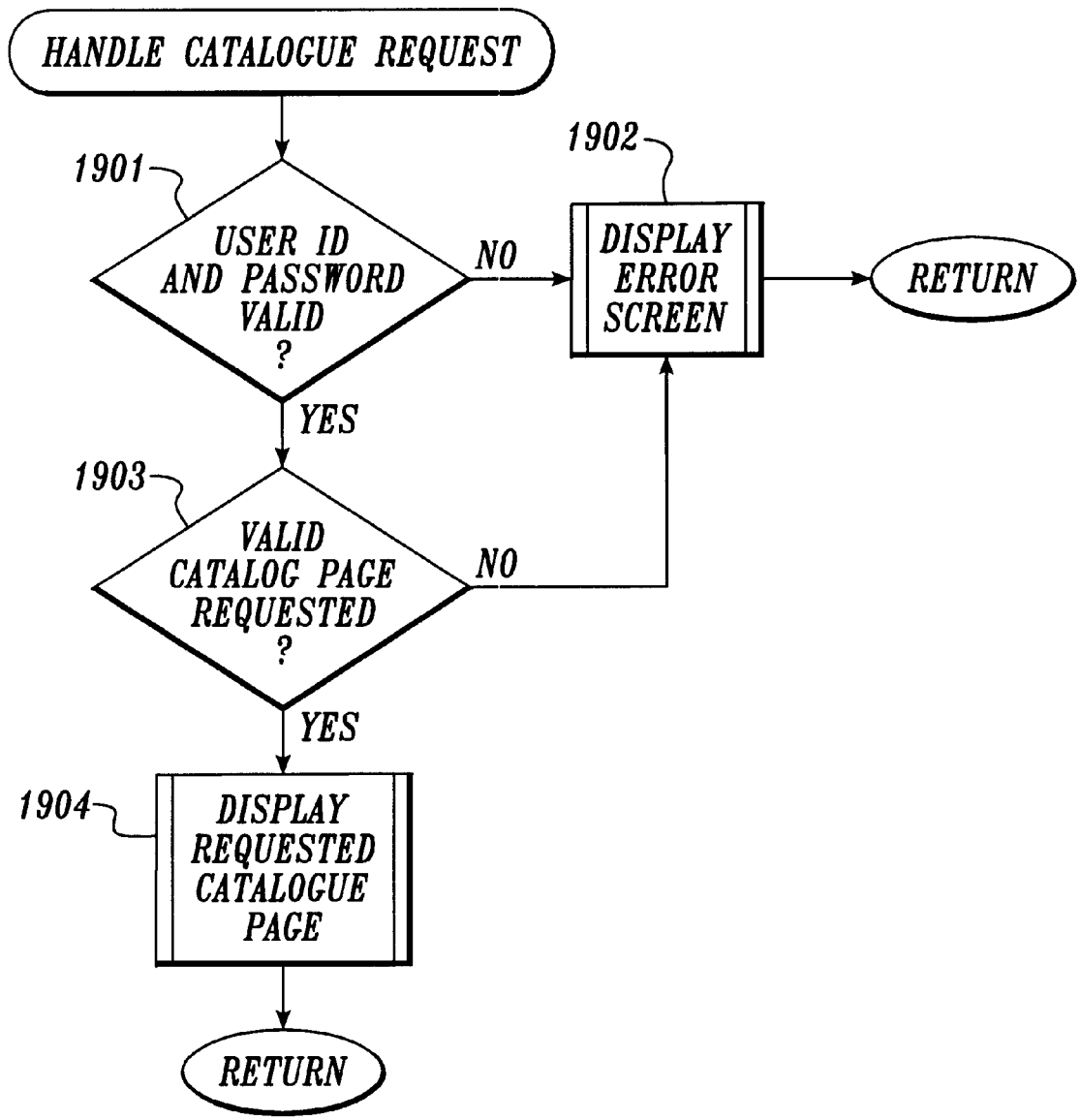
FIG. 19 shows a flow control diagram for the routine Catalog_Request.

FIG. 19 displays a flow control diagram of the routine Catalog_Request. In step 1901, Catalog_Request determines whether the representative ID and password, supplied along with the request, is valid and corresponds to the Internet address of the requesting VO. This is necessary because the merchant is a stateless server, as described above, and does not maintain a login connection for a VO. If the representative ID and password are valid, Catalog_Request determines, in step 1903, whether a valid catalog Web page has been requested. If so, then Catalog_Request calls Display_Requested_Catalog_Page in step 1904 to retrieve and send the requested catalog Web page to the requesting VO. Otherwise, Catalog_Request sends an error screen to the VO in step 1902.

Figure 20:
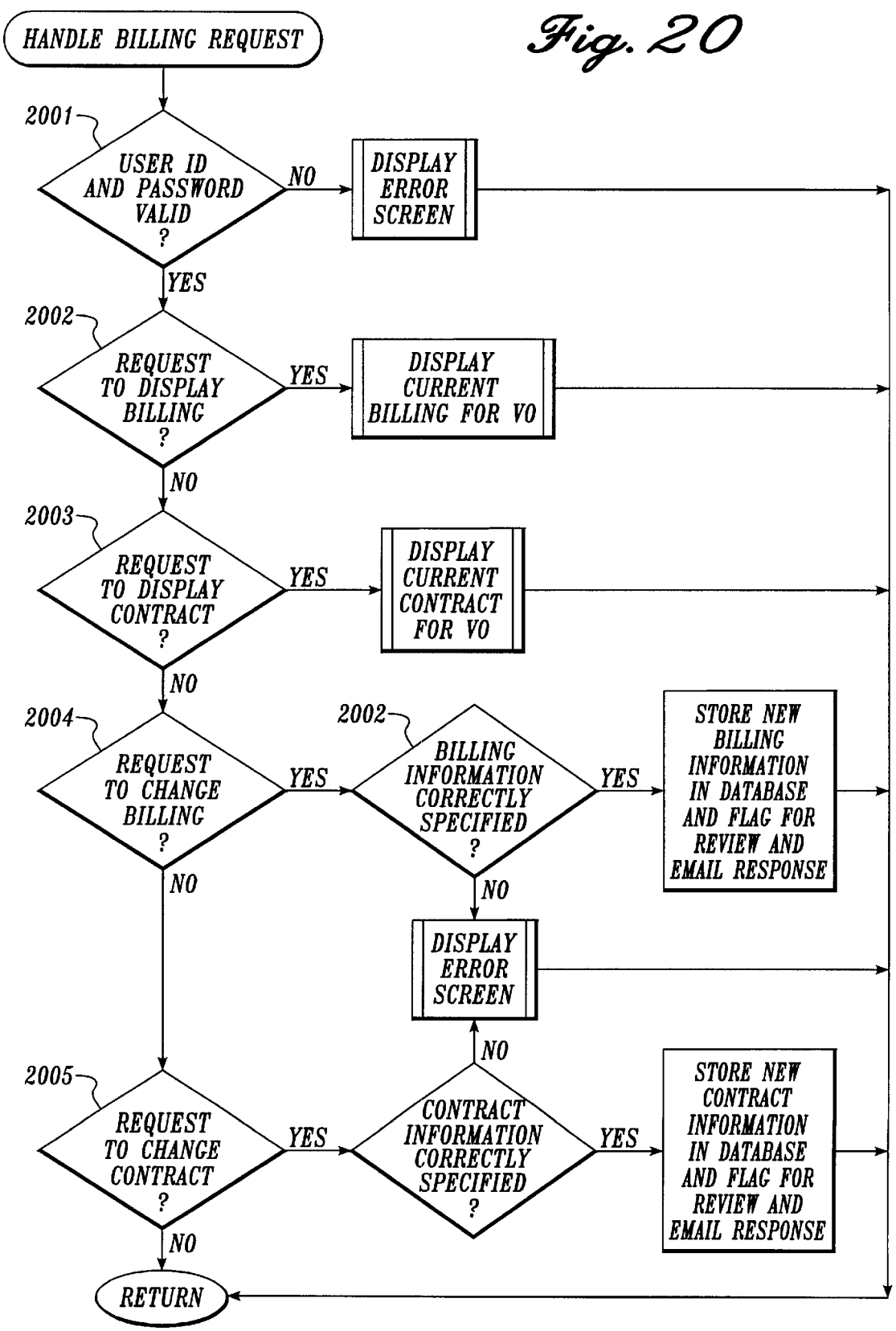
FIG. 20 shows a flow control diagram for the routine Billing_Request.

FIG. 20 displays a flow control diagram for the routine Billing_Request. After verifying the representative ID and password in step 2001, Billing_Request determines the type of the request received from the VO in steps 2002–2005, calling routines to display requested Web pages, as appropriate, or checking and storing billing or contract information supplied by the VO.

Figure 21:
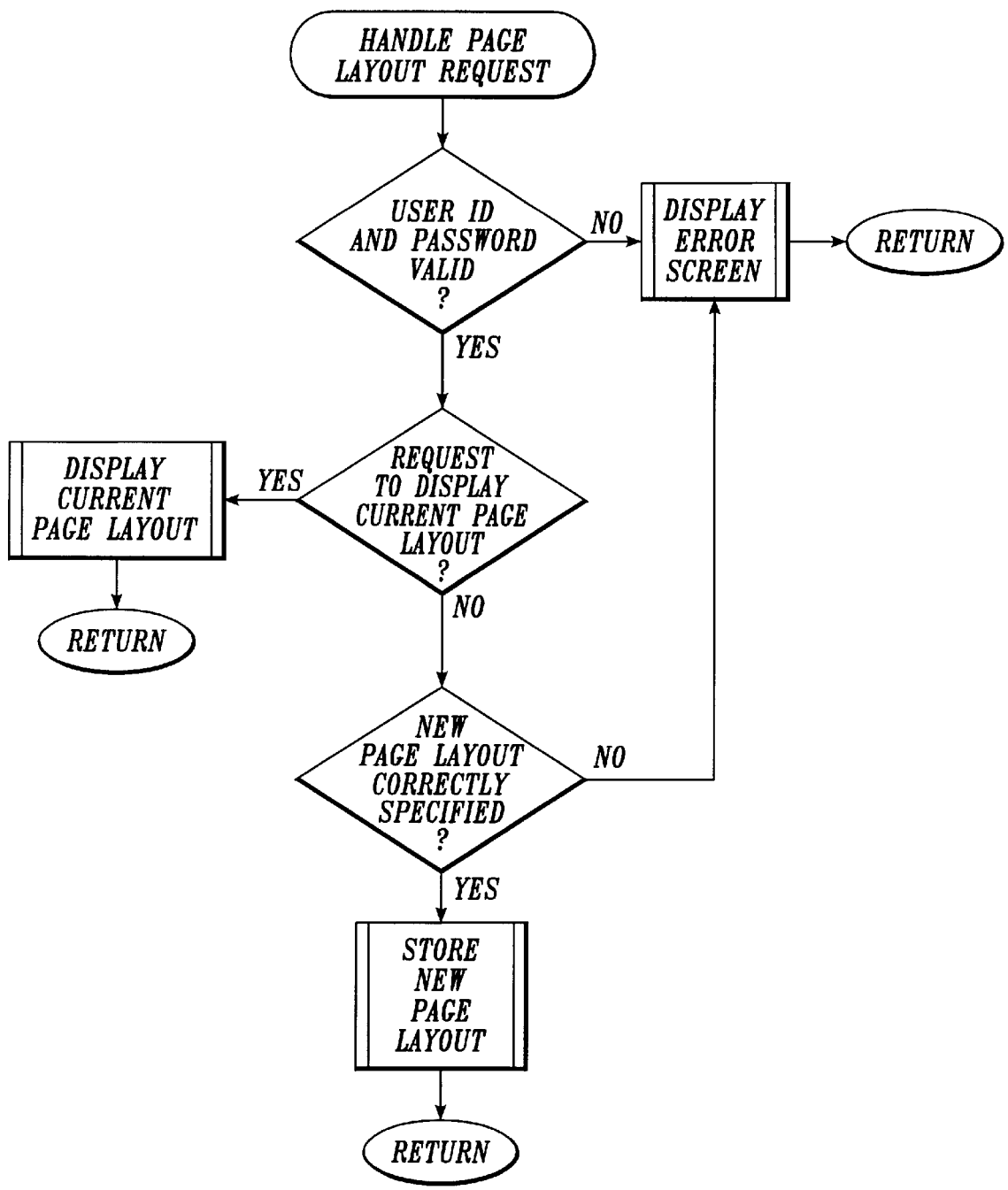
FIG. 21 shows a flow control diagram for the routine Page_Layout_Request.
Figure 22:
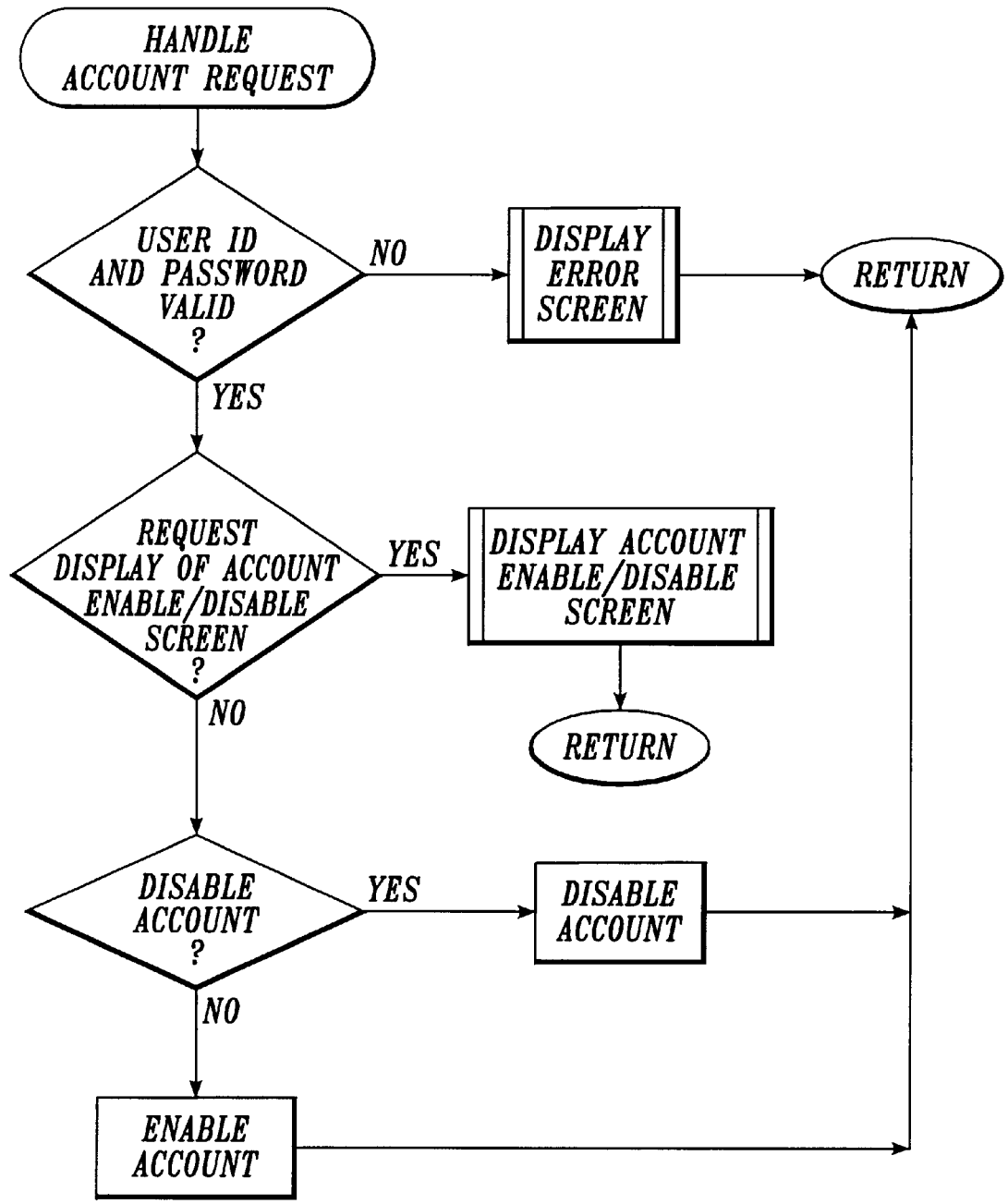
FIG. 22 shows a flow control diagram for the routine Account_Request.
Figure 23:
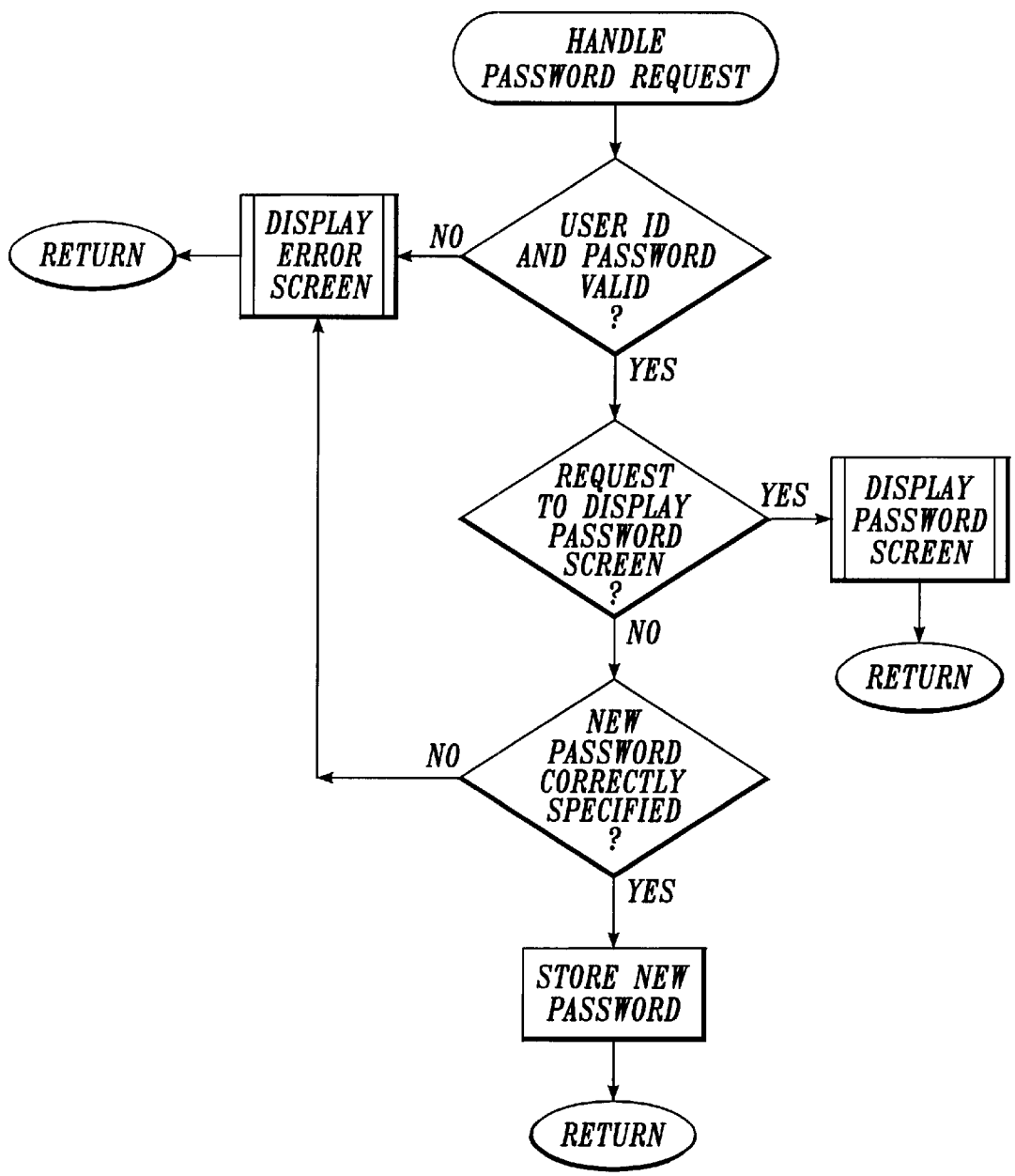
FIG. 23 shows a flow control diagram for the routine Password_Request.

FIGS. 21, 22, and 23 display control flow diagrams for the routines Page_Layout, Account_Request, and Password_Request. The logic in all three routines is similar. The VO ID and password are verified, and then the type of request is determined by the routine and handled by either retrieving and sending a display Web page to the requesting VO or by accepting, checking, and storing information supplied to the merchant computer by the VO. These routines are counterparts to maintenance component processes launched from the VO maintenance component. They support processes by which the VO changes the appearance of order Web pages displayed by the merchant to customers, the state of the VO's account with the merchant, and the VO's password. Additional routines may be implemented to process additional types of requests made by a VO to the merchant as part of maintaining the VO's account.

Merchant Order Processing Component

Figure 24:
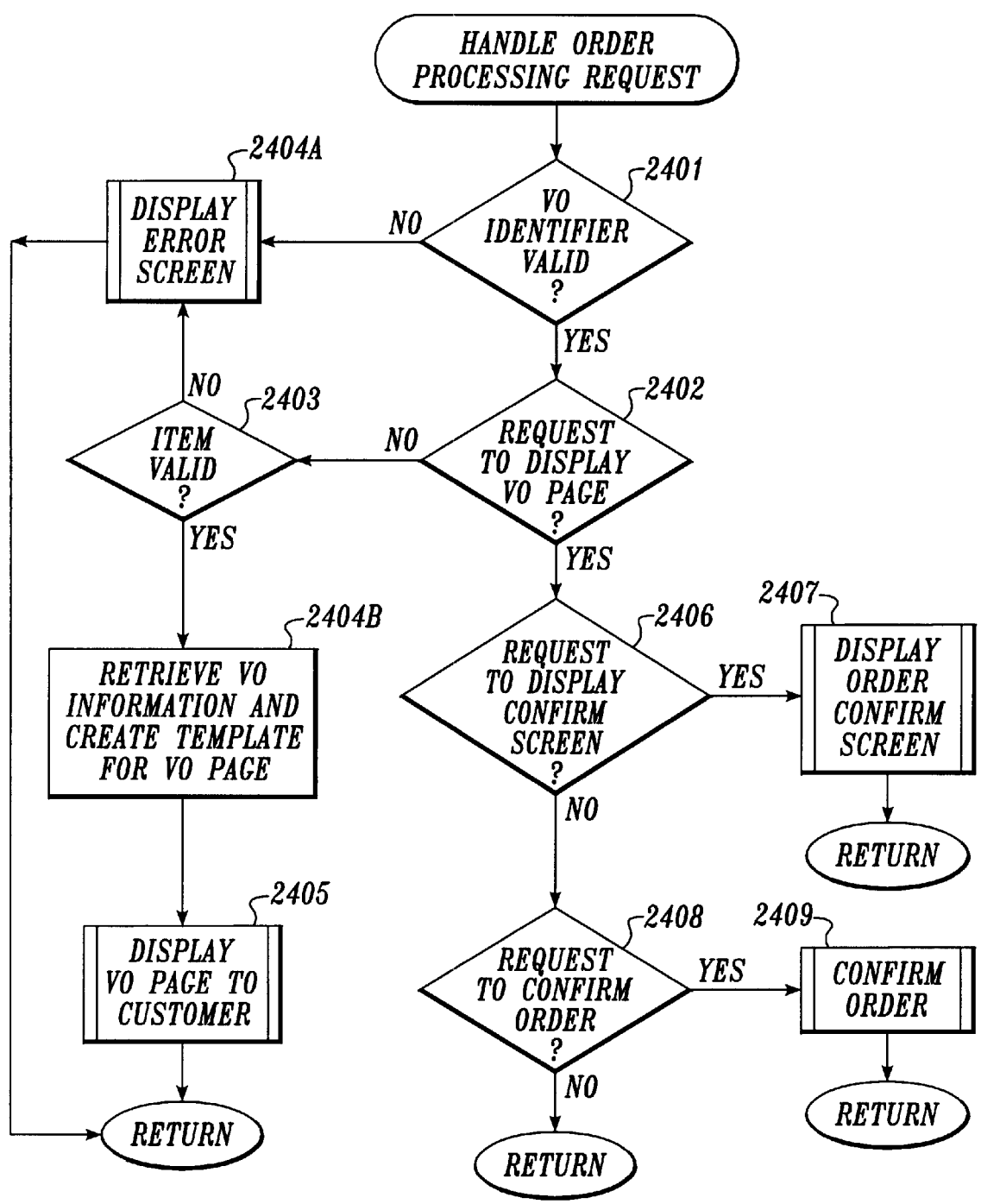
FIG. 24 shows a flow control diagram for the routine Order_Processing_Request FIG. 25 displays an example Web page from a virtual outlet.

FIG. 24 displays a flow control diagram for the routine Order_Processing_Request. In step 2401, Order_Processing_Request verifies that the VO identifier received by the merchant by the requesting customer is valid. If not, Order_Processing_Request sends an error screen to the customer in step 2404. Then, Order_Processing_Request determines what type of request has been made by a customer in steps 2402, 2406, 2408. If the request is to display an order Web page corresponding to an item displayed by the VO on a VO Web page, where the request has come to the merchant via a hotlink from the VO Web page, then Order_Processing_Request determines in step 2403 whether the item is valid, and, if so, retrieves stored information supplied by the VO that allows the merchant computer to construct an order Web page that appears similar to a VO Web page and uses the information to construct a description of an order Web page and send it to the customer in step 2405. Some information, including the VO logo, may be obtained from the VO by accessing VO files using stored URLs. Other information may be stored entirely on the merchant computer. If the request was made by the customer to display a confirmation Web page, then the merchant processes information supplied by the customer that was elicited from the customer by the order Web page, prepares a confirmation Web page which displays that information, and sends the confirmation Web page to the customer in step 2407. Finally, in step 2408 if the request was to confirm the order, after the customer has reviewed the information displayed in the confirmation Web page, then in step 2409 Order_Processing_Request stores the information on the merchant computer to be subsequently used to send the ordered item to the customer and to bill the customer's account for the ordered item.

Figure 25:
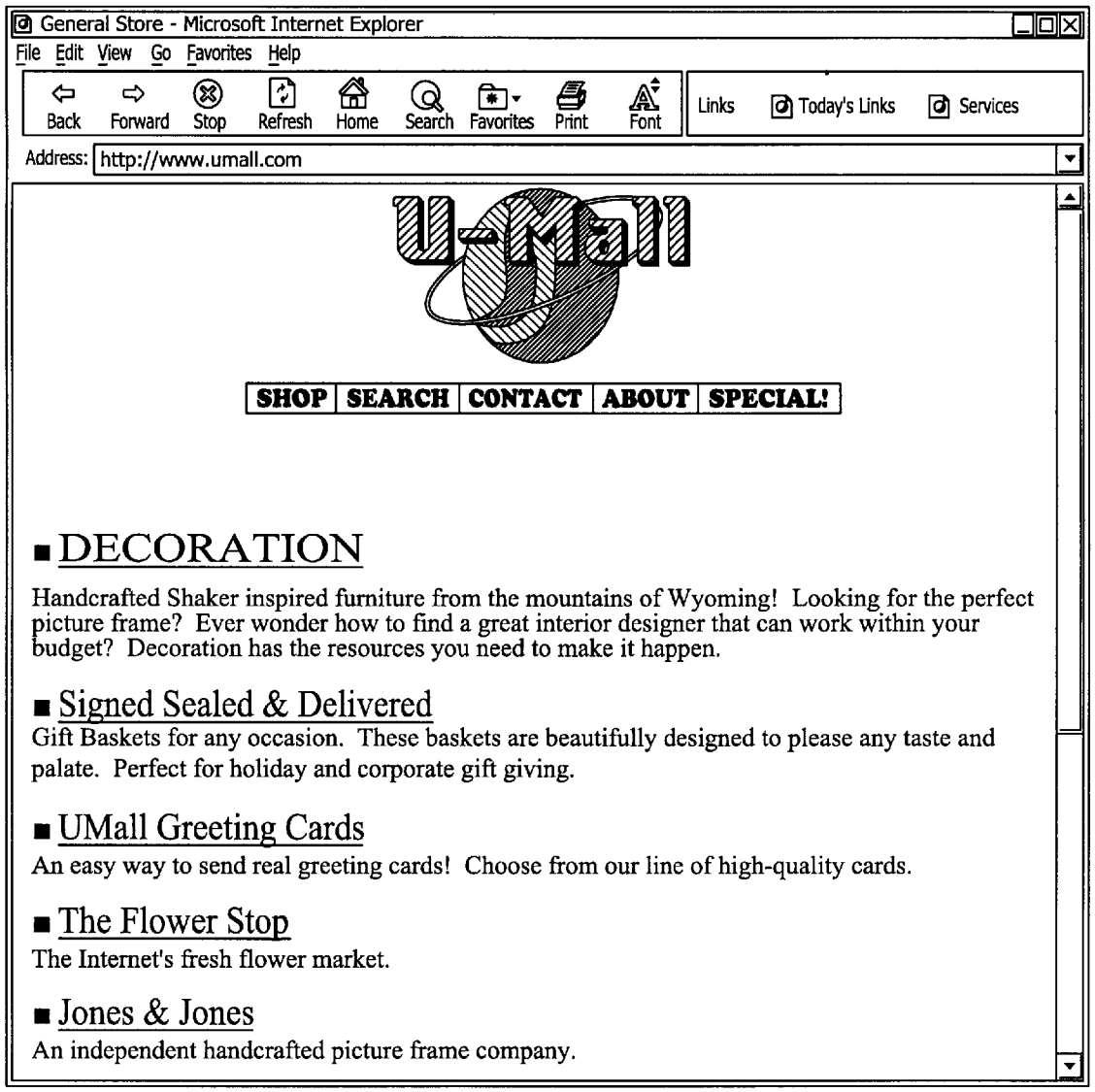
Figure 26:
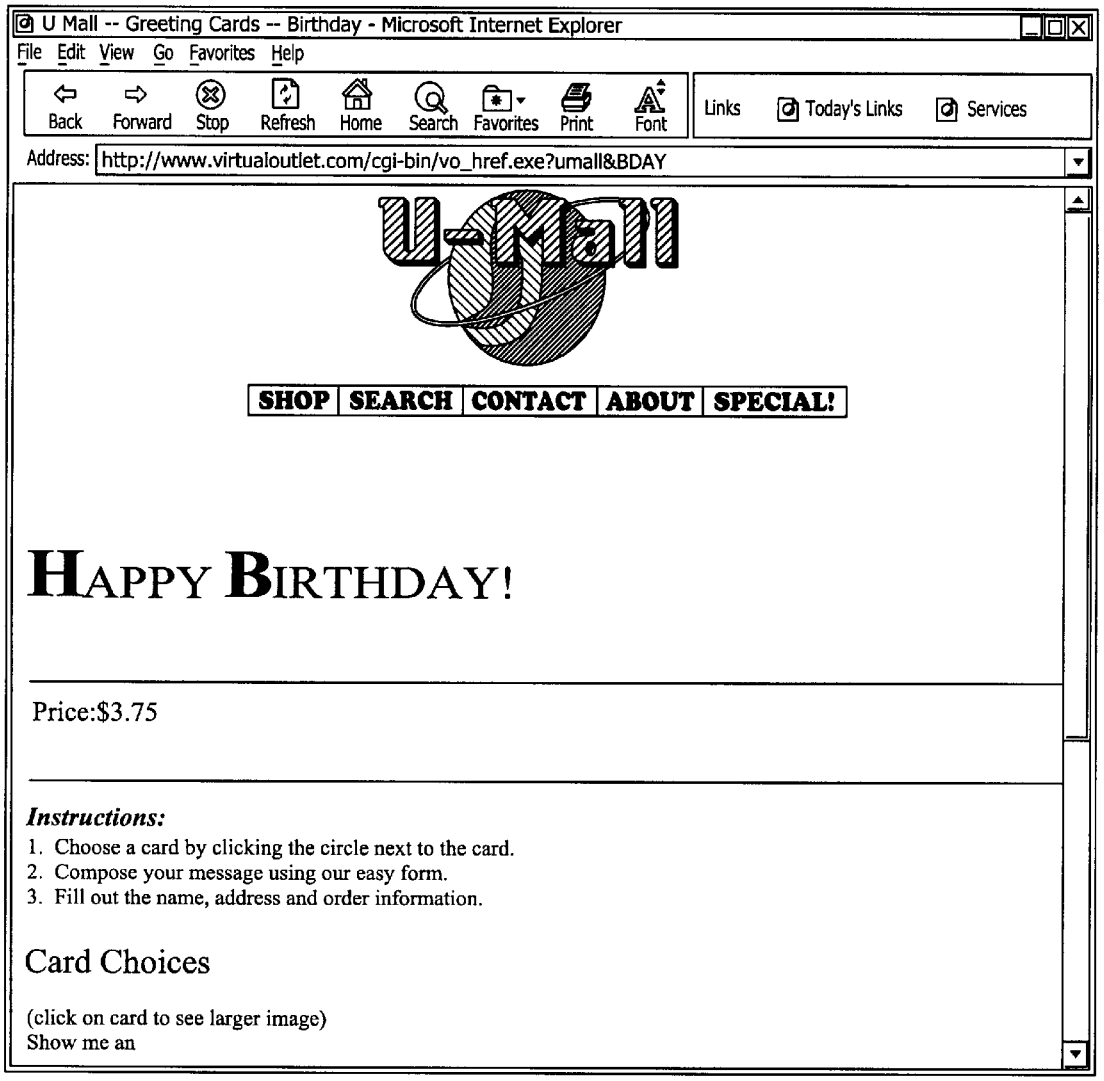
FIG. 26 displays an example order Web page.
Figure 27:
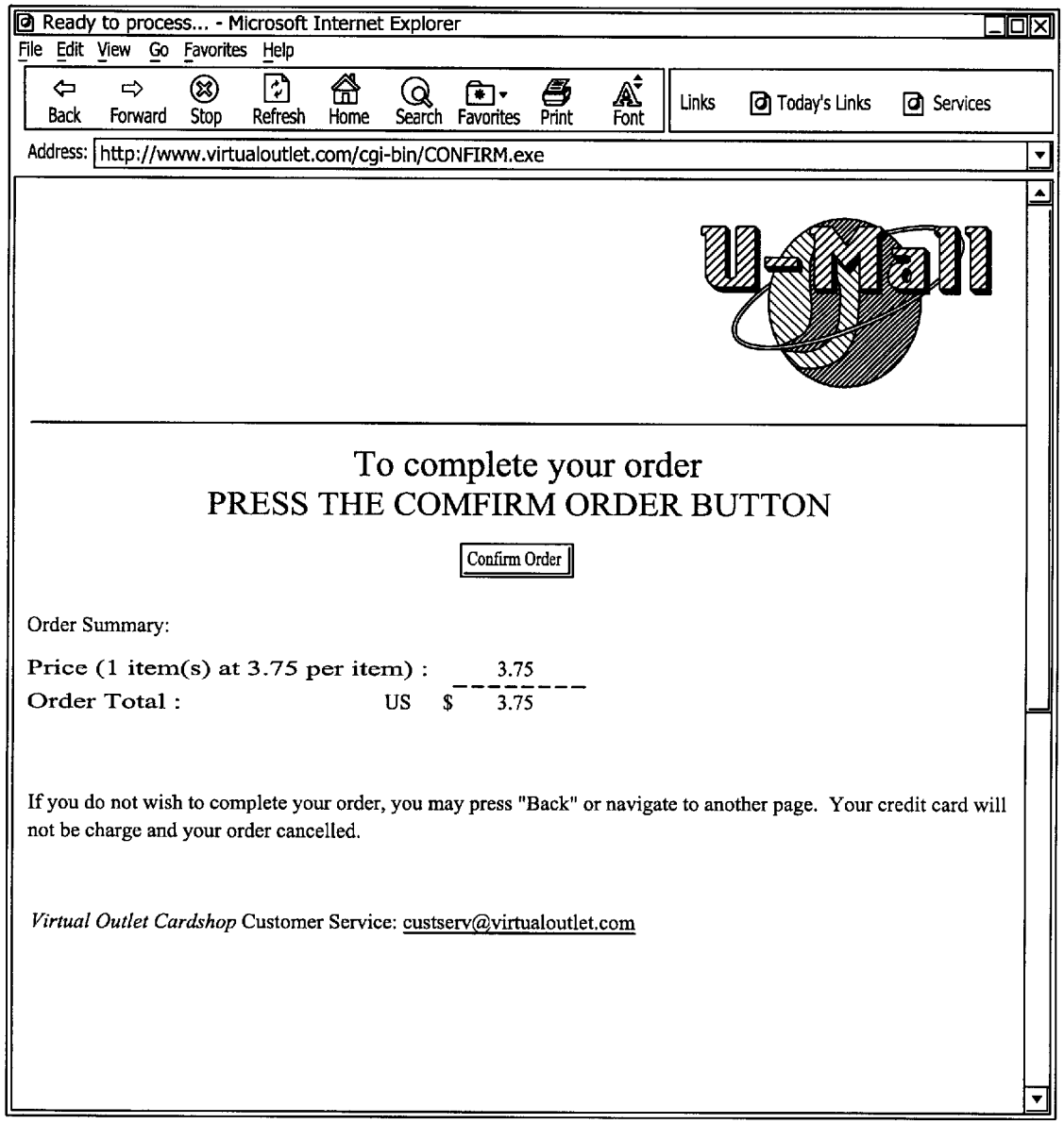
FIG. 27 displays an example order confirmation Web page.

FIG. 25 displays an example display Web page from a VO, including a number of items that can be ordered by a customer. If the customer chooses to order a greeting card, then the customer will link directly to the greeting card merchant, who prepares and sends to the customer the order Web page displayed in FIG. 26. When the customer supplies the requested information in response to the order Web display page and sends it back to the merchant, the merchant then prepares and sends to the customer the order confirmation Web page shown in FIG. 27. These three example Web pages illustrate one possible appearance of VO and merchant order Web pages. The VO retailing system is, however, quite flexible, and can accommodate a large number of different approaches to Web page design, sequence of Web page displays, and VO retail relationships.

Although the present invention has been described in terms of a preferred embodiment, it is not intended that the invention be limited to this embodiment. Modifications within the spirit of the invention will be apparent to those skilled in the art. The scope of the present invention is defined by the claims that follow.

We claim:

1. A method for tracking a purchase of a product supplied by merchant; the purchase being made by a customer through a virtual outlet; the merchant, virtual outlet, and customer each having a computer connected through the Internet; the method comprising:

receiving at the virtual outlet computer from the customer computer a request for a virtual outlet Web page, the virtual outlet Web page having an indication of the product and a link associated with the product, the link identifying a merchant Web page of the merchant computer, identifying the virtual outlet, and identifying a virtual outlet return Web page;

sending from the virtual outlet computer to the customer computer the virtual outlet Web page;

displaying at the customer computer the virtual outlet Web page;

receiving from the customer at the customer computer a selection of the product;

sending from the customer computer to the merchant computer a request for the merchant Web page identified by the link associated with the selected product, the request including an indication of the virtual outlet;

receiving at the merchant computer the request for the merchant Web page;

upon receiving the request for the merchant Web page, under control of the merchant computer, modifying the merchant Web page to contain a return link based on the indication of the virtual outlet included in the request so that upon completion of the purchase, the customer computer displays the virtual outlet return Web page identified by the return link; and sending from the merchant computer to the customer computer the modified merchant Web page;

displaying at the customer computer the modified merchant Web page, wherein after the customer purchases the product from the merchant, the merchant credits the virtual outlet identified by the link; and upon completion of the purchase, displaying at the customer computer the virtual outlet return Web page identified by the return link in the modified merchant Web page.

2. The method of claim 1 wherein the merchant computer maintains a database of information describing a desired layout of the merchant Web page when the merchant Web page is accessed through the virtual outlet Web page and wherein the merchant computer customizes the merchant Web page in accordance with the information.

3. The method of claim 2 wherein the information includes a name and logo of the virtual outlet.

4. The method of claim 2 wherein the information includes preferred coloring of the merchant Web page.

5. The method of claim 1 wherein the links are universal resource locators.

6. A method for returning to a first computer through which a second computer accesses information provided by a third computer, comprising:

receiving at the third computer from the second computer a link identifying a resource an identifying an entity associated with the first computer, the link being supplied by the first computer to the second computer; and upon receiving the link at the third computer,
under control of the third computer, generating a return link that identifies a return resource based on the entity identified in the received link; and
sending to the second computer the return link along with the resource identified by the received link so that upon completion of accessing the resource identified by the received link, the second computer can access the return resource identified by the return link.

7. The method of claim 6 wherein the computers are interconnected through the Internet and the resources are Web pages.

8. The method of claim 6 wherein the first computer is a computer of a virtual outlet, the second computer is a computer of a customer, and a third computer is a computer of a merchant.

9. The method of claim 8 wherein the resource identified by the received link is a Web page that allows a customer to purchase a product of a merchant.

10. The method of claim 8 including tracking the virtual outlet identified by the received link for providing access to the resource identified by the received link.

11. The method of claim 6 including customizing the resource identified by the received link based on the entity identified by the link.

12. The method of claim 6 wherein the links are universal resource locators.

13. A method for providing a second computer with access to information provided by a third computer through a resource that is similar in appearance to a resource provided by a first computer; the first, second, and third computers being interconnected; the method comprising:

receiving at the third computer from the second computer a link identifying a resource and identifying an entity associated with the first computer, the link being supplied by the first computer to the second computer; and upon receiving the link at the third computer,
under control of the third computer, customizing the resource identified by the received link based on the entity identified in the received link; and
sending to the second computer the customized resource so that the second computer can display the customized resource, the customized resource having an overall appearance similar to the displayed resources of the first computer.

14. The method of claim 13 wherein the first computer is a virtual outlet computer, the second computer is a customer computer, and the third computer is a merchant computer.

15. The method of claim 14 wherein the step of customizing includes customization options provided by the virtual outlet.

16. The method of claim 15 wherein the customization option is a virtual outlet logo.

17. The method of claim 15 wherein the customization option is a color.

18. The method of claim 15 wherein the customization option is a font.

19. The method of claim 15 wherein the customization option is a banner ad.

20. The method of claim 15 wherein upon receiving the link at the merchant computer, the merchant computer accesses the virtual outlet computer to retrieve the customization option.

21. The method of claim 14 wherein the computers are interconnected through the Internet and the resources are Web pages.

22. The method of claim 14 wherein the resource identified by the received link is a Web page that allows a customer to purchase a product of a merchant.

23. The method of claim 14 including crediting the virtual outlet identified by the received link with providing access to the resource identified by the received link.

24. A method for selling through a virtual outlet a product of a merchant to a customer; the merchant, virtual outlet, and customer each having computers; the method comprising:

receiving at the virtual outlet computer from the customer computer a request to access a virtual outlet resource indicating products being offered for sale through the virtual outlet;

sending from the virtual outlet computer to the customer computer the virtual outlet resource that indicates products being offered for sale, the virtual outlet resource including a link that identifies a merchant resource and that identifies a return virtual outlet resource so that the merchant computer can modify the merchant resource to include a link to the return virtual outlet resource so that the customer can access the return virtual outlet resource using the modified merchant resource after the customer has completed the purchase; and receiving at the virtual outlet computer from the customer computer a request to access the return virtual outlet resource.

25. The method of claim 24 wherein the return virtual outlet resource and the virtual outlet resource are the same resources.

26. The method of claim 24 wherein the resources are Web pages.

27. A method in a computer system for establishing a relationship between a virtual outlet and a merchant so that the virtual outlet can offer to a customer over a network, a product that is for sale by the merchant; the virtual outlet, customer, and merchant each having a computer; the method comprising:

establishing a database of information at the merchant computer, the database including an identification of the virtual outlet and representative interface aspects to be provided by the merchant computer to the customer computer; and supplying from the merchant computer to the virtual outlet computer a link that identifies a merchant resource associated with the merchant computer and that uniquely identifies the virtual outlet; wherein the virtual outlet computer supplies the link to the customer computer, when the customer computer uses the link to access the merchant resource, the merchant computer provides the merchant resource to the customer computer in a manner customized to the virtual outlet, such manner being based on the database of information and identifying the virtual outlet that provided the link to the customer computer.

28. The method of claim 27 wherein the computers are interconnected through the Internet and the resources are Web pages.

* * * * *